United States Patent [19]
Lupton et al.

[11] Patent Number: 5,726,456
[45] Date of Patent: Mar. 10, 1998

[54] ENCAPSULATED MATERIALS

[75] Inventors: E. Cornelius Lupton; Xiaohong Yu, both of Boston; Lev Bromberg, Lynn, all of Mass.; Barry Joseph Hand, Monroe, N.Y.

[73] Assignee: Gel Sciences, Inc., Bedford, Mass.

[21] Appl. No.: 487,857

[22] Filed: Jun. 7, 1995

Related U.S. Application Data

[62] Division of Ser. No. 390,349, Feb. 17, 1995.

[51] Int. Cl.⁶ .............................. B01J 13/16; C09K 3/00
[52] U.S. Cl. .......................... 252/182.21; 252/182.2; 252/600; 264/4.3; 264/4.7; 428/321.5; 428/402.21; 428/402.24; 502/527; 525/936
[58] Field of Search ................... 252/315.4, 182.2, 252/182.21; 264/4.3, 4.7; 428/402.24, 321.5; 525/926, 902, 936; 523/211; 502/527

[56] References Cited

U.S. PATENT DOCUMENTS

| | | | |
|---|---|---|---|
| 3,179,716 | 4/1965 | Bruin et al. | 525/123 |
| 3,405,070 | 10/1968 | Reyes | 264/4.3 X |
| 3,409,461 | 11/1968 | Mehlo et al. | |
| 3,494,872 | 2/1970 | Materson et al. | |
| 3,540,914 | 11/1970 | Lin . | |
| 3,551,346 | 12/1970 | Breen et al. | |
| 3,565,818 | 2/1971 | Bayless et al. | |
| 3,607,775 | 9/1971 | Yoshida et al. | |
| 3,627,581 | 12/1971 | Phillips . | |
| 3,639,259 | 2/1972 | Scarpelli . | |
| 3,654,314 | 4/1972 | Farber et al. | |
| 3,672,935 | 6/1972 | Miller et al. | |
| 3,703,397 | 11/1972 | Lin et al. | |
| 3,860,565 | 1/1975 | Barber, Jr. | 523/211 X |
| 3,865,726 | 2/1975 | Chibata et al. | 210/202 |
| 3,932,361 | 1/1976 | Russell et al. | |
| 3,939,105 | 2/1976 | Jones, Jr. et al. | |
| 3,939,123 | 2/1976 | Matthews et al. | |
| 3,954,678 | 5/1976 | Marquisee | 252/62.53 |
| 4,020,005 | 4/1977 | Lang | 252/315.1 X |
| 4,035,467 | 7/1977 | Campbell et al. | |
| 4,046,741 | 9/1977 | Scher . | |
| 4,093,674 | 6/1978 | Tsutsui et al. | |
| 4,100,148 | 7/1978 | Hockenberger et al. | 528/374 |
| 4,140,516 | 2/1979 | Scher . | |
| 4,155,741 | 5/1979 | Scher et al. | |
| 4,165,102 | 8/1979 | Bodmer | 282/27.5 |
| 4,209,605 | 6/1980 | Hoy et al. | 528/54 |
| 4,224,422 | 9/1980 | Rude et al. | 525/454 |
| 4,355,130 | 10/1982 | Heinze | 524/491 |
| 4,413,069 | 11/1983 | Marshall | 523/211 X |
| 4,439,488 | 3/1984 | Trimnell et al. | 428/402.24 |
| 4,461,854 | 7/1984 | Smith | 523/211 |
| 4,483,974 | 11/1984 | Grögler et al. | 528/68 |
| 4,525,570 | 6/1985 | Blum et al. | 528/75 |
| 4,546,165 | 10/1985 | Grögler et al. | 528/53 |
| 4,619,985 | 10/1986 | Hess et al. | 528/49 |
| 4,644,033 | 2/1987 | Gnanou et al. | 524/590 |
| 4,666,968 | 5/1987 | Downey et al. | 524/296 |
| 4,666,969 | 5/1987 | Brauer et al. | 524/310 |
| 4,667,008 | 5/1987 | Grögler et al. | 528/67 |
| 4,690,786 | 9/1987 | Ninomiya et al. | 264/4.6 |
| 4,939,190 | 7/1990 | Tomioka et al. | 525/902 X |
| 4,999,213 | 3/1991 | Meyer . | |
| 5,000,955 | 3/1991 | Gould et al. | 424/409 |
| 5,089,582 | 2/1992 | Lewis | 528/15 |
| 5,221,713 | 6/1993 | Kempner et al. | 525/902 X |
| 5,292,829 | 3/1994 | Konno et al. | 525/902 X |

FOREIGN PATENT DOCUMENTS

| | | |
|---|---|---|
| 0 162 364 A2 | 11/1985 | European Pat. Off. . |
| 53-031579 | 3/1978 | Japan . |
| 2-097535 | 4/1990 | Japan . |
| 3-292818 | 12/1991 | Japan . |
| 6-202777 | 7/1994 | Japan . |
| 1 301 801 | 1/1973 | United Kingdom . |
| 2 025 321 | 1/1980 | United Kingdom . |

OTHER PUBLICATIONS

Bromberg et al., "Extraction Chromatography with Modified Poly(Vinyl Chloride) and Di(2–ethylhexyl) Dithiophosphoric Acid", Jour. of Chrom., 634, pp. 183–196, 1993.

*Primary Examiner*—Richard D. Lovering
*Attorney, Agent, or Firm*—Choate, Hall & Stewart

[57] ABSTRACT

Methods and compositions for encapsulated polymeric gels swollen with nonaqueous reactive materials are provided. The methods include gel synthesis, swelling of a gel precursor with a first nonaqueous reactive material, and encapsulation of the swollen gel with a second nonaqueous reactive material. Gels precursors may be synthesized from crosslinking polymers, or alternatively, may be formed by crosslinking and polymerizing a monomer starting material. An accelerator may be utilized to facilitate swelling of the gel precursor with the first nonaqueous reactive material. Foams and composites may also be swollen with the first nonaqueous reactive material. The swollen gel is then contacted with a second nonaqueous reactive material such that an encapsulation layer is formed thereby. The encapsulated gels may be stored for subsequent use. The methods further include release of the first nonaqueous reactive material encapsulated within the gel under conditions which compromise the integrity of the encapsulation layer. The released first nonaqueous reactive material is then reacted with a nonaqueous reactive material, the reaction product being a useful product for a variety of applications such as coatings, adhesives, sealings, caulking, laminating materials, electrical coatings and the like.

21 Claims, 10 Drawing Sheets

Release of Hexamethylene Diisocyanate from gels into THF

Release of Hexamethylene Diisocyanate from gels into THF

ENCAPSULATED MATERIALS

This is a divisional of application Ser. No. 08/390,349 pending filed on Feb. 17, 1995.

TECHNICAL FIELD

The present invention generally relates to methods for nonaqueous encapsulating nonaqueous materials and nonaqueous compositions for encapsulated materials.

BACKGROUND OF THE INVENTION

Polymeric materials used for a variety of applications may be divided into "fully reacted" systems and "reactive" systems. Fully reacted systems are those materials which are synthesized by the supplier and are delivered in finished fashion to the molder or the user. Examples of fully reacted systems include polyethylene, polypropylene and nylon. Reactive systems are delivered in semi-finished or monomeric form by the supplier to the molder or the user and undergo further reaction. Examples of reactive systems include polyurethanes (which are the reaction product of isocyanates and polyols), polyureas (which are the reaction product of isocyanates and amines or water), epoxies, reactive acrylics, alkyds and many others.

These multi-component nonaqueous reactive systems are used extensively to produce polymeric coating compositions (e.g. paints), adhesives, sealants, and the like. Because the individual components react with each other, it has been difficult to formulate nonaqueous reactive component combinations which have the necessary performance properties, have the reactive capability needed to form the finished product, yet have a long shelf life under normal storage conditions. Useful reactants are chosen on the basis of many factors and the generally recognized problem is that there are multiple constraints placed on the "ideal" reaction component combination. It is important to provide reactive component combinations that do not sacrifice one property (e.g., long shelf life) in order to satisfy another property (e.g., reactive capability or end-use properties).

In order to overcome these difficulties, it is common to utilize reactant systems in which the reactants are stored in separate formulations or are compartmentalized in such a manner that the reactants are combined with one another just prior to use or application. In one type of nonaqueous reactive chemistry, an adhesive mixture is applied to the surfaces to be joined and then either reacts spontaneously, or has the reaction rate enhanced through heat, absence of oxygen, catalysts or other means. In another example, commonly used equipment known in the art to formulate polyurethane coatings utilizes two high energy component streams, i.e. a polyol and an isocyanate, that are mixed before application. In a typical paint spray application line (see U.S. Pat. No. 4,999,213), a stream of polyol and a stream of isocyanate are mixed in an in-line mixer just before application. Under ideal conditions, this mixed stream flows promptly and cleanly through the paint spray application equipment before any reaction occurs between the polyol and the isocyanate. However, any stoppage of application of the paint, as often occurs, or a breakdown of the equipment, results in the formation of soft and hard particles in the application equipment.

Other methods have been devised to compartmentalize the reactants in order to increase the shelf life and decrease the contact time between the reactants prior to actual commingling. One method is to use less reactive pre-polymers or capped reactants such as capped isocyanate groups.

Encapsulation of reactants (e.g., isocyanate) is also used and processes are well known for producing capsules of reactive materials, exemplified by U.S. Pat. No. 3,409,461. It is known that highly reactive solids and reactive liquids may be compartmentalized by encapsulation through a variety of chemical and physical means including, but not limited to, interfacial polymerization in a liquid medium, in-situ polymerization, two component nozzle polymerization, centrifugal polymerization, spray drying, fluid bed drying and rotational suspension separation encapsulation. Nevertheless, prior art encapsulation methods may require additional steps in preparing the reactants and impingement mixing of two or more reactants requiring elaborate equipment, may require high temperatures to release the encapsulated materials, may introduce undesirable foreign materials into the product as the residue of encapsulant and may only be suitable for certain types of reactants, such as solids. Gels have unique properties that may offer significant advantages as compartments for reactive chemicals but, to our knowledge, encapsulation of gels containing reactive chemicals has not been successfully accomplished.

Therefore, the generic problem of maintaining the integrity of several highly nonaqueous reactive components in a reaction mixture is still problematic. The specific problem of forming polymer articles such as polyurethanes and the like under controlled conditions and at reasonable rates still has not been satisfactory resolved.

SUMMARY OF THE INVENTION

The present invention pertains, in part, to a three-dimensional, polymer gel network containing a nonaqueous reactive material. The polymer gel network is encased in a polymeric layer. In some cases, the layer is synthesized using a portion of the nonaqueous reactive material that is incorporated within the interstices of the polymer gel network.

Embodiments of the invention provide methods and compositions for swelling and encapsulating polymeric gel materials having nonaqueous reactive materials incorporated therein. The encapsulated gels are suitable for storage and subsequent use. The encapsulated nonaqueous reactive material may be released and reacted with another material to provide a variety of products for use in connection with coatings, adhesives, sealings, caulkings, laminating materials, electrical coatings, foams, and the like. Additionally, the encapsulated materials are suitable for use in connection with elastomeric processing by reaction injection molding for automobile fascia, bumpers, body panels and the like. The products produced with the encapsulated gels of the present invention possess excellent heat resistances, chemical resistances, electrical characteristics and abilities to withstand extreme weather conditions.

One aspect of the invention is a three dimensional, crosslinked polymer gel network comprising a first nonaqueous reactive material in which the material is capable of entering into a spontaneous chemical reaction or capable of catalyzing a spontaneous chemical reaction. Preferably, the first nonaqueous reactive material is capable of being polymerized or capable of catalyzing a polymerization reaction. The gel network may be a responsive gel network and may for example be selected from the group consisting of: a gel network of poly (N,N-disubstituted acrylamide), a gel network of polyacrylate esters, a gel network of polyalkyl substituted vinyl ethers, and a gel network of polyglycol ethers or a mixture thereof. The monomer(s) used to form the network may consist of N,N-disubstituted acrylamide(s), acrylate ester(s), alkyl substituted vinyl ether(s), glycol ether(s) or mixture thereof. The crosslinking agent may be selected from di(ethylene glycol) bis (allyl carbonate), methylene bis (acrylamide), ethylene glycol dimethacrylate, magnesium methacrylate and mixtures thereof.

The first nonaqueous reactive material may, for example, be selected from an isocyanate, a multifunctional amine, an organometallic, an acid, an acyl halide, an acrylate and mixtures thereof. Moreover, the first polymeric component and the first nonaqueous reactive material together form a three-dimensional polymeric network in which the first polymeric component is capable of swelling and disgorging the first nonaqueous reactive material under predetermined conditions. It is preferred that the first polymeric component be nonreactive (i.e., "chemically inert") with respect to the first nonaqueous reactive material.

A further embodiment of the invention is a process of swelling a gel network with a nonaqueous reactive material. The process comprises exposing a three dimensional polymer gel network to a nonaqueous reactive material that is capable of entering into a spontaneous chemical reaction or capable of catalyzing a spontaneous chemical reaction. Preferably, the first nonaqueous reactive material is either polymerizable or is capable of catalyzing a polymerization reaction. The step of exposing is performed under conditions sufficient for the nonaqueous reactive material to be incorporated into the polymer gel network. Preferably, prior to the step of exposing, a monomer is combined with a crosslinking agent under conditions sufficient to form a mixture and sufficient for the monomer to polymerize and form the gel network.

Another embodiment is a process for swelling a gel network that includes the steps of contacting the gel network with a gel displacing agent prior to exposure to the nonaqueous reactive material such that the gel swells and the displacing agent displaces any fluid incorporated into the gel network. Next, the gel is collapsed with a gel collapsing agent under conditions sufficient for the gel to disgorge the displacing agent from the gel network.

To facilitate the swelling process, a low molecular weight swelling accelerator agent may be utilized. Exemplary swelling accelerator agents include, but are not limited to, ketones, ethers, cyclic ethers and mixtures thereof. After the swelling process has been completed, the swelling accelerator agent is removed from the gel by vacuum stripping or the like.

A process for encapsulating a three dimensional, polymer gel network is described which includes providing a three dimensional, polymer gel network having incorporated in it a first nonaqueous reactive material that is capable of entering into a spontaneous chemical reaction or capable of catalyzing a spontaneous chemical reaction. Preferably, the first nonaqueous reactive material is capable of being polymerized or capable of catalyzing a polymerization reaction. Next, the polymer gel network is exposed to one or more second nonaqueous reactive materials under conditions sufficient for the first material and the one or more second nonaqueous reactive materials to react to form a polymer layer on an outer surface of the gel network. Exemplary gel networks include a gel network of a poly (N,N-disubstituted acrylamide), a gel network of a polyacrylate ester(s), a gel network of a polyalkyl substituted vinyl ether(s), a gel network of a polyglycol ether(s) or a mixture thereof. Preferred first nonaqueous reactive materials include isocyanates, multifunctional amines, organometallics, acyl halides, acrylates, acids, acid anhydrides. The first nonaqueous reactive material may also be a catalyst.

Another process for encapsulating a three dimensional, polymer gel network comprises providing a three dimensional, polymer gel network having incorporated in it a first nonaqueous reactive material. The first nonaqueous reactive material is capable of entering into a spontaneous chemical reaction or capable of catalyzing a spontaneous chemical reaction. The polymer gel network is exposed to a second nonaqueous reactive material under conditions sufficient for the second nonaqueous reactive material to react to form a polymer layer on an outer surface of the three dimensional, polymer gel network.

Another process for encapsulating a three dimensional, polymer gel network comprises providing a three dimensional, polymer gel network having incorporated in it a first nonaqueous reactive material. The first nonaqueous reactive material is capable of entering into a spontaneous chemical reaction or capable of catalyzing a spontaneous chemical reaction. The polymer gel network is exposed to a second material external to the gel under conditions sufficient for the second material external to the gel to react to form a polymer layer on an outer surface of the three dimensional, polymer gel network.

A further embodiment is an encapsulated polymeric gel that contains a three dimensional, polymeric gel network having incorporated in it a first nonaqueous reactive material and a polymeric encapsulation layer on an outer surface of the gel network. The polymeric encapsulation layer is derived from a reaction involving at least the first nonaqueous reactive material. Moreover, the encapsulation layer is capable of providing a barrier for the gel network and for the first nonaqueous reactive material incorporated within the network. Preferred polymeric gel networks that are encapsulated include networks comprising a poly (N,N-disubstituted acrylamide), a gel network of a polyacrylate ester(s), a gel network of a polyalkyl substituted vinyl ether(s), a gel network of a polyglycol ether(s) or a mixture thereof. Preferred first nonaqueous reactive materials incorporated into the gel include an isocyanate, a multifunctional amine, an organometallic, an acyl halide, and mixtures thereof, and preferred encapsulation layers are polyurethanes, polyureas, and mixtures thereof.

Encapsulated gel networks may also include a liquid into which the encapsulated gel is immersed, the encapsulation layer providing a barrier to efflux of the first nonaqueous reactive material from the gel network and a barrier to influx of the liquid into the gel network.

Polymer gel networks in which the encapsulation layer is hydrophobic such that the encapsulation layer acts as a barrier to water entering the gel network are also encompassed within the invention. In the case of hydrophobic encapsulation layers, the encapsulation layer is also preferably lyophilic, so that exposure of the gel network to a second nonaqueous reactive material is sufficient to compromise the encapsulation layer on the outer surface of the gel network.

Another embodiment of the invention is a paint system that includes a three-dimensional polymeric network having incorporated in the network a first nonaqueous reactive material that is capable of entering into a spontaneous chemical reaction or of catalyzing a spontaneous chemical reaction. Preferably, the first nonaqueous reactive material is capable of being polymerized or capable of catalyzing a polymerization reaction. The gel network further includes an encapsulation layer on an outer surface of the gel and a liquid into which the gel is immersed. The first nonaqueous reactive material is capable of reaction with the liquid to form a reaction product which is a paint. Most preferably, the first nonaqueous reactive material is an isocyanate and the liquid comprises a polyol plus additives, a dye, a pigment, a colorant and the like. Similarly, a coating system may include the polymeric gel network of the invention having a polymeric encapsulation layer on an outer surface of the gel and a liquid into which the encapsulated gel is immersed. The first nonaqueous reactive material may be capable of spontaneous reaction with the liquid to form a reaction product which is a coating material.

An adhesive material system may include the encapsulated polymeric network of the invention having incorporated in it a first nonaqueous reactive material that is capable of entering into a spontaneous chemical reaction or capable of catalyzing a spontaneous chemical reaction. Preferably, the first nonaqueous reactive material is capable of being polymerized or capable of catalyzing a polymerization reaction. The first nonaqueous reactive material is capable of reaction with the liquid to form a reaction product which is an adhesive material.

A process of using an encapsulated three-dimensional polymeric gel network, is also disclosed and includes the steps of providing a three-dimensional polymeric gel network having a first nonaqueous reactive material incorporated in it, the first nonaqueous reactive material capable of entering into a spontaneous chemical reaction or capable of catalyzing a spontaneous chemical reaction. Preferably, the first nonaqueous reactive material may be polymerized or may be capable of catalyzing a polymerization reaction. The gel network further includes a polymeric encapsulation layer on an outer surface of the gel network. The gel network is then exposed to at least one condition sufficient to compromise the encapsulation layer on the outer surface of the gel, thereby allowing the first reactive material contained in the gel to be released. A preferred process includes either exposing the gel to a second material that will either swell the gel or collapse the gel network, agitating the gel network or exposing the gel to a given temperature, pH or other trigger, any of which may compromise the encapsulation layer on the outer surface of the gel.

A further embodiment is a process of making a polymer product that includes providing the encapsulated three-dimensional polymeric gel network of the invention that has a first nonaqueous reactive material incorporated in the network and exposing the gel network to conditions sufficient to disgorge the first nonaqueous reactive material contained in the gel network. The disgorged first nonaqueous reactive material is allowed to contact one or more second nonaqueous reactive materials under conditions sufficient for the first and the one or more second nonaqueous reactive materials to form a polymeric product from a reaction between them.

A preferred process includes either exposing the gel to a second nonaqueous reactive material that will either swell the gel or collapse the gel network, agitating the gel network or exposing the gel to a given temperature, pH or other trigger, all of which cause the first nonaqueous reactive material to be disgorged from the gel network. A polymeric product formed by this process may include a polyurethane paint, a coating material, a foam and an adhesive material. The product may still retain a detectable amount of the original gel network so that another aspect of the invention is an adhesive, a coating material, or a laminating material that includes a detectable amount of a polymeric gel network incorporated in the product. This gel network may include a network of poly (N,N-disubstituted acrylamide), a gel network of a polyacrylate ester(s), a gel network of a polyalkyl substituted vinyl ether(s), a gel network of a polyglycol ether(s) or a mixture thereof. In some cases, a properly designed gel network can serve as a filler or functional component of the finished end-use product.

A method of coating a molded article is also encompassed within the invention and includes the steps of providing a three-dimensional polymeric gel network having a first nonaqueous reactive material of the invention incorporated in it. The gel network is exposed to conditions sufficient to disgorge the first nonaqueous reactive material and the disgorged first nonaqueous reactive material is allowed to contact one or more second nonaqueous reactive materials under conditions sufficient for the first and the one or more second nonaqueous reactive materials to form a polymeric product from a reaction between them. The molded article is then contacted with the polymeric product.

A process of making a polymeric product selected from the group consisting of a foam, an adhesive, a coating, a paint, and a molded article is also described and comprises providing a three-dimensional polymeric gel network having a first nonaqueous reactive material incorporated therein, the first nonaqueous reactive material capable of entering into a spontaneous chemical reaction or capable of catalyzing a spontaneous chemical reaction, the gel network further comprising a polymeric encapsulation layer on an outer surface of the gel network. Next, one exposes the gel network to at least one condition sufficient to compromise the encapsulation layer on the outer surface of the gel network, thereby allowing the first nonaqueous reactive material contained therein to be disgorged and the disgorged first nonaqueous reactive material is allowed to react to form the polymeric product.

It is an object of the present invention to provide a gel which is chemically inert with respect to a nonaqueous reactive material, but which is capable of swelling in the nonaqueous reactive material.

It is another object of the invention to provide a method for swelling a gel with a nonaqueous reactive material in which the gel is chemically inert with respect to the nonaqueous reactive material.

It is a further object of the invention to provide a method for swelling a gel with an isocyanate, a multifunctional amine, an acrylate, an organometallic, acyl halide, an acid or an acid anhydride.

It is a further object of the invention to provide a method for swelling a gel with an isocyanate under accelerated conditions with the use of a low molecular weight solvent.

It is another object of the invention to provide a polymeric gel having a nonaqueous reactive compound like an isocyanate, an acrylate, multifunctional amine, an organometallic material, an acyl halide, or an acid, an acid anhydride incorporated into the gel network.

It is another object of the invention to provide a method for encapsulating a polymeric gel having a reactive organic solvent, an acrylate, a multifunctional amine, an organometallic material, an acyl halide an acid, an acid or anhydride, incorporated into the gel network.

It is another object of the invention to provide a method for encapsulating a polymeric gel having a nonaqueous reactive material, an isocyanate, a multifunctional amine, an organometallic material, an acyl halide, an acid, an acrylate, or an acid anhydride incorporated therein, in which a portion of the nonaqueous reactive material is combined with another reactive material to form an encapsulation layer on an outer surface of the gel.

It is another object of the invention to provide an encapsulated gel having a nonaqueous reactive material, an isocyanate, a multifunctional amine, an organometallic material, an acyl halide, an acid, an acid anhydride or mixtures thereof, incorporated into the gel network, which gels are suitable for storage and subsequent use in connection with coatings, adhesives, foams, sealings, caulkings, laminating materials, electrical coatings and the like.

It is still another object of the invention to provide encapsulated gels containing a first nonaqueous reactive material, the encapsulated gel immersed in a nonaqueous second reactive material with which the first material is capable of reacting.

It is still another object of the invention to provide encapsulated gels containing an isocyanate, the gels immersed in a polyol or a polyamine.

It is still another object of the invention to provide encapsulated gels containing a multifunctional amine, the gels immersed in an epoxy precursor.

It is still another object of the invention to provide methods for using a material contained within an encapsulated gel under specified conditions.

It is still another object of the invention to provide encapsulated gels which will release nonaqueous reactive components which will produce polyurethanes, epoxies, acrylates, alkyds, esters and other polymers.

It is still a further object of the invention to provide a product which is formed by releasing a material contained within an encapsulated gel and reacting the released material with at least one other material outside the gel.

It is still another object of the invention to provide an encapsulated hydrophobic, lyophilic gel containing a reactive material therein, thereby providing a water-barrier for the material within the gel and a swelling medium in the presence of a compatible solvent.

It is yet another object of the present invention to provide an encapsulated gel which is thermally responsive such that the gel reversibly expands to a transparent state at an elevated temperature and collapses to an opaque state at a lower temperature.

It is yet another object of the present invention to provide an encapsulated gel wherein the polymeric gel includes a material which is a component of a finished product.

It is yet another object of the present invention to provide a system containing two or more encapsulated gels having a reactant and a catalyst contained therein.

The benefits of the use of this invention are the ability to control nonaqueous reactive systems which have improved performance, lower cost, longer shelf life, longer pot life and improved quality.

The foregoing has outlined some of the more pertinent objects of the present invention. These objects should be construed to be merely illustrative of some of the more prominent features and applications of the invention. Many other beneficial results can be attained by applying the disclosed invention in a different manner of modifying the invention as will be described. Accordingly, other objects and a fuller understanding of the invention may be had by referring to the following Detailed Description of the Preferred Embodiments.

BRIEF DESCRIPTION OF THE DRAWINGS

For a fuller understanding of the present invention, reference is had to the following description taken in conjunction with the accompanying drawings, in which.

Similar reference characters refer to similar parts throughout the several views of the drawings.

DETAILED DESCRIPTION OF THE PREFERRED EMBODIMENTS

I. DEFINITIONS

As used herein, a "gel" is a three-dimensional, crosslinked polymer network containing a solvent. It is used interchangeably with the term "gel network". On the contrary, a "gel precursor" is a three-dimensional, crosslinked polymer network, preferably in dry form, which does not contain the solvent. The "solvent" is a liquid or semi-liquid material which may be a pure material or a mixture and may contain one or more liquids or solid solutes. In addition, a "nonaqueous reactive material" may be considered to be an organic, an inorganic or an organometallic compound or a mixture of compounds that lack a substantial quantity of water. The reactive material is capable of entering into a spontaneous chemical reaction or capable of catalyzing a spontaneous chemical reaction. Preferably, the first nonaqueous reactive material is capable of being polymerized or capable of catalyzing a polymerization reaction. The nonaqueous reactive material is thus capable of reaction with other compounds but substantially not capable of reaction with the gel precursor or gel. Such nonaqueous reactive materials, include, but are not limited to isocyanates, multifunctional amines, organometallic compounds, acyl halides, acids, acid anhydrides, acrylates and the like. A "catalyst" is an organic, an inorganic, or organometallic compound or mixture of compounds capable of modifying the reaction rate, reaction pathway or reaction completeness of one or more chemical reactions. Normally, the catalyst will either not be consumed in the chemical reaction, or will be consumed at a molar rate much less than that of the primary reactants.

The term "hydrophobic" as used herein in connection with a gel defines a property of a gel that does not swell in water or that does not collapse in water. The term "lyophilic" as used herein to defines a property of a gel (i.e., a "lyogel") that swells in a nonaqueous organic solvent. It is important to note that "lyophilicity" does not mean that the gel will swell in every organic solvent. A gel may swell in one organic solvent, but not swell in another or in mixture of solvents. It is essential to verify that the gel is "lyophilic" to the solvent being considered. The term "detectable amount" refers to the presence of a material in a product which is detectable, but which does not react with other materials present in the product. The term "nonaqueous" means containing no substantial quantity of water.

A "spontaneous chemical reaction" is a reaction which will proceed at a measurable pace under the conditions of mixing of the ingredients and does not require addition factors such as increased temperature, pressure or light to proceed.

II. GENERAL CONSIDERATIONS

Methods of encapsulating three dimensional, polymer gel networks will now be briefly discussed with reference to the schematic of FIGS. 1(a)–1(c).

Figure 1A:
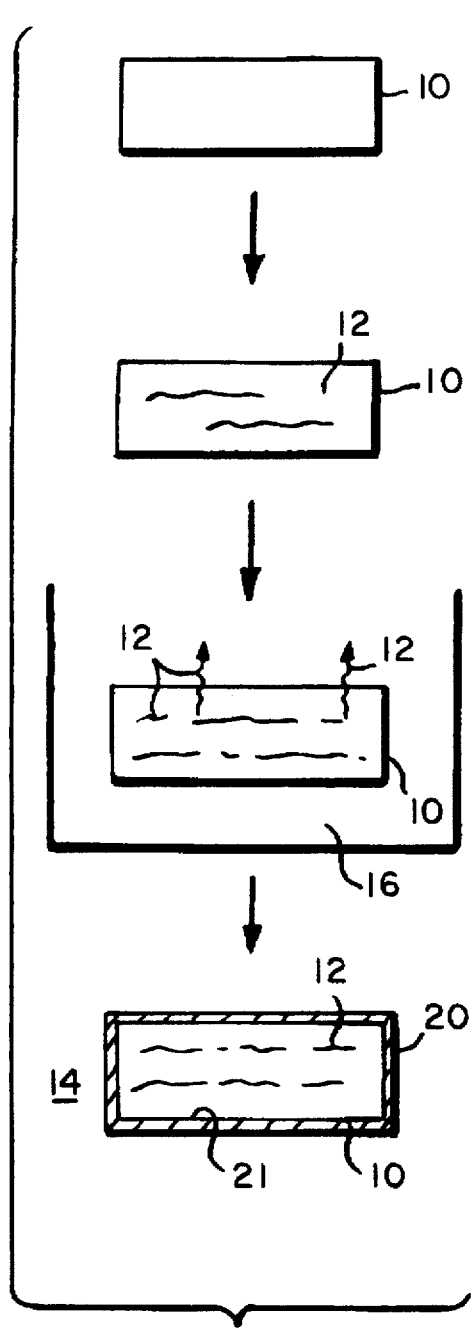
FIGS. 1(a)–1(c) illustrate various methods of encapsulating gels in accordance with the present invention.

Referring now to FIG. 1(a), a three dimensional, cross-linked polymer gel network 10 is provided. This polymer gel network may be synthesized using conventional procedures well known in the art, as discussed in more detail below in Section III. Polymer gel network 10 is then exposed to a first nonaqueous reactive material 12. The first nonaqueous reactive material 12 has one of the following characteristics: (i) the first nonaqueous reactive material, most preferably an organic compound, is most preferably capable of entering into a spontaneous chemical reaction; and/or (ii) the first nonaqueous reactive material is a catalyst, preferably an organic or an organometallic catalyst, that is capable of catalyzing a reaction, preferably a polymerization reaction. The three dimensional polymer gel network 10 is contacted with the first nonaqueous reactive material 12 under conditions sufficient for the first nonaqueous reactive material 12 to be incorporated into the polymer gel network 10. The term "incorporated" means that the polymeric gel network will be swollen by the first nonaqueous reactive material 12 so that the first nonaqueous reactive material is held within the gel.

The next step in the process shown in FIG. 1(a) is the process of forming an encapsulated gel 14. The three dimensional polymer gel network 10 containing the incorporated first nonaqueous reactive material 12 is contacted with a second nonaqueous reactive material 16 that is external to the gel network 10. The second nonaqueous reactive material(s) 16 (see reference numeral 18 in FIG. 1(b) for additional second nonaqueous reactive materials has the following properties: (i) the second nonaqueous reactive material(s), preferably an organic compound, is capable of being polymerized; (ii) the second nonaqueous reactive material(s) may contain a catalyst, preferably an organic or organometallic catalyst, capable of catalyzing a polymerization reaction or (iii) a mixture of materials having the properties of (i) and (ii).

Once the polymer gel network 10 containing the incorporated first nonaqueous reactive material 12 is exposed to the second nonaqueous reactive material 16, conditions are imposed that are sufficient for a portion of the first nonaqueous reactive material 12 to efflux from the polymer gel network 10 and contact the second nonaqueous reactive material 16 that is disposed external to the gel. A layer of polymeric material 20, hereinafter referred to as an "encapsulation layer" or "polymer layer", is formed around at least a portion of the outer peripheral surface 21 of the gel network 14, layer 20 being the reaction product of the first and second nonaqueous reactive materials. Thus, if the first nonaqueous reactive material 12 is a polymerizable organic compound such as an isocyanate, and the second nonaqueous reactive material 16 includes at least a polyol and, optionally, an organometallic catalyst, then the first and second nonaqueous reactive materials would react to form a polyurethane layer 20 around at least a portion of the gel network. Alternatively, if the first nonaqueous reactive material were a diacid chloride and the second nonaqueous reactive material were a diamine, the first and second nonaqueous reactive materials would react to form a polyamide. In the polyurethane example illustrated, it will be appreciated that the polyol may be incorporated in the gel, and the isocyanate be disposed external to the gel. Normally, the nonaqueous reactive material that is readily used in the purest form will be incorporated into the gel network. Isocyanates are preferably incorporated into the gel network and polyols, which in typical industrial processes contain secondary substances such as dyes, pigments, colorants, additives and the like, are disposed external to the gel network.

Without intending to be bound by any theory, it is believed that the polymerization reaction between the first and second nonaqueous reactive materials is self-limiting. That is, as the polymerization reaction proceeds, it deposits a layer of polymeric product 20 around the outside of the gel 10. As polymerization reaction proceeds, the thickness of layer 20 increases, setting up a diffusion barrier, and the efflux of the first nonaqueous reactive material 12 from within the gel network 10 is gradually eliminated. The surficial polymerization reaction between the internal contents of the gel 12 and the external contents of the gel 16, 18 will eventually cease. The final result is a three dimensional polymer gel network 10 surrounded by a polymeric layer 20; i.e. an encapsulated gel 14.

In addition to the methods listed, there are two other general methods of forming an encapsulated gel. The gel may be coated with two reactive materials in succession with an "inert" material, such as a catalyst, in the gel. Additionally, the gel may be coated with a material and a solvent. The solvent is thereafter dried, leaving the coating in place. There are many process variations in which either of these methods can be accomplished. Referring now to FIG. 1(b), a three-dimensional polymer gel network 10 is exposed to a first nonaqueous reactive material 12 (as in FIG. 1(a)), under conditions sufficient for the first nonaqueous reactive material 12 to be swollen into the polymer gel 10. Next, the polymer gel network 10 having the first nonaqueous reactive material 12 incorporated therein, is exposed to one or more second nonaqueous reactive materials 16, 18 that are external to the gel network 10. We note that this method may be distinguished from the method of FIG. 1(a) in that first nonaqueous reactive material 12 incorporated into the polymer gel network 10 in FIG. 1(b) does not efflux from within the gel network 10 and an encapsulation layer 20 is formed by the reaction of the external nonaqueous reactive materials 16, 18 with each other to form a polymeric encapsulated layer 20, i.e. an encapsulated gel 14. It will be appreciated that, in this embodiment, the first nonaqueous reactive material 12 inside the gel network 10 may be identical to one of the second nonaqueous reactive materials 16, 18. It is also possible in this case that the first nonaqueous reactive material will not spontaneously react with any of the second nonaqueous reactive materials to form a polymeric encapsulation layer.

Alternately, the first nonaqueous reactive material 12 may participate in the polymerization reaction in the following way: a portion of the first nonaqueous reactive material 12 effluxes from within the gel network to the surface of the gel network and reacts with second nonaqueous reactive material 16 external to the network, thereby initiating the formation of encapsulation layer 20. Non-aqueous reactive material 18 then is added to material 16 to facilitate the rate of formation of encapsulation layer 20. Nonaqueous reactive material 18 may also be physically separated from nonaqueous reactive material 16. In this case, the gel 10 having first nonaqueous reactive material 12 therein is contacted with second nonaqueous reactive material 16. Next, gel 10 is then removed from nonaqueous reactive material 16 and contacted with nonaqueous reactive material 18. Subsequent contacting of gel 10 in nonaqueous reactive materials 16 and 18 may be desired to increase the thickness of encapsulation layer 20.

Figure 1B:
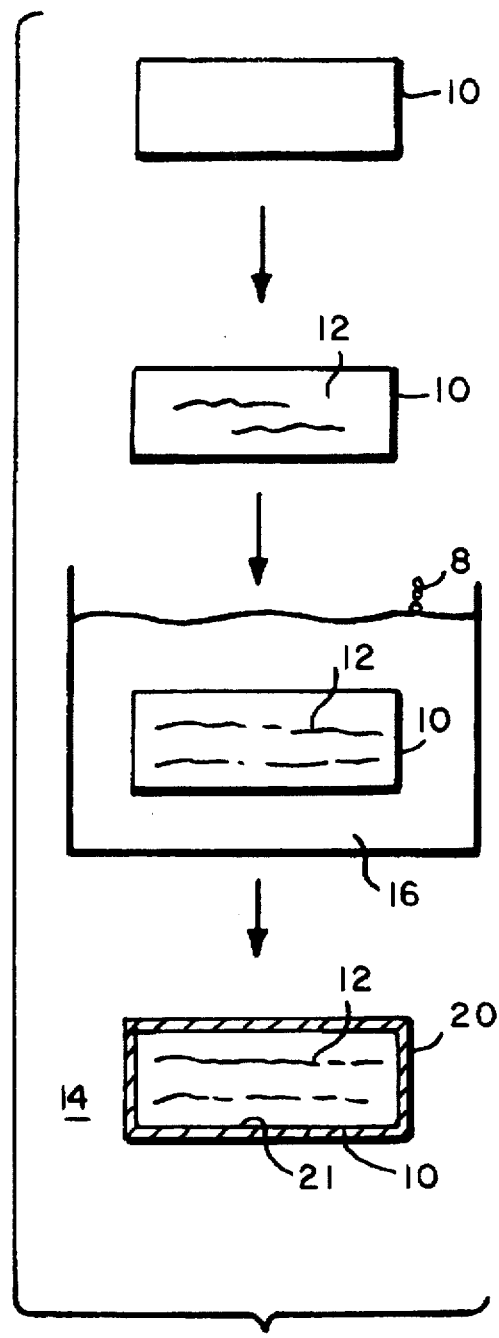
Figure 1C:
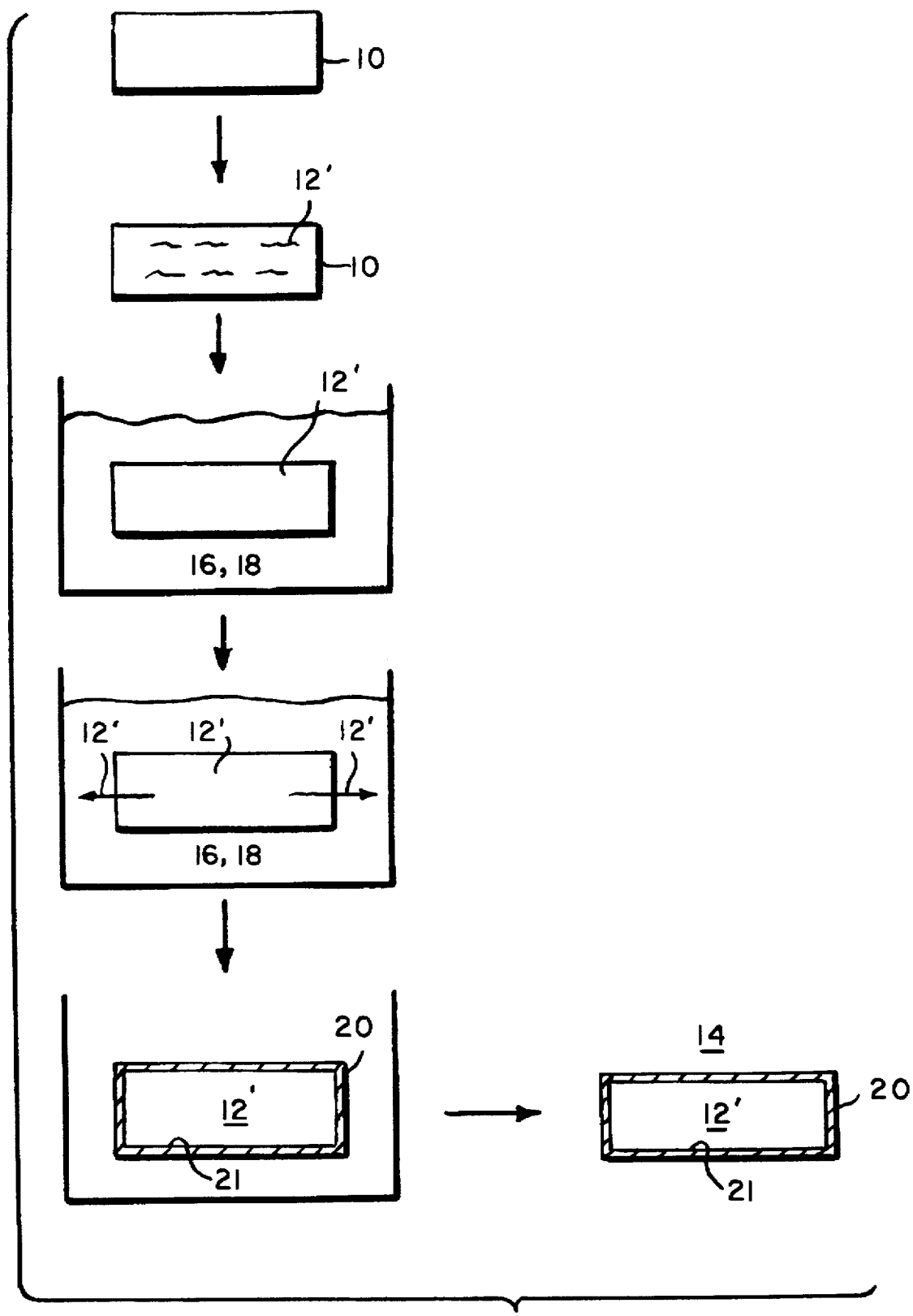

FIG. 1(c) schematically illustrates the case where the first nonaqueous reactive material 12' is a catalyst capable of catalyzing a spontaneous chemical reaction. The most preferred catalysts are organic or organometallic catalysts. A three dimensional polymer gel network 10 is placed in contact with a first nonaqueous reactive catalyst 12' under conditions sufficient for the catalyst 12' to be incorporated into the polymer gel network 10. The polymer gel network 10 incorporated with the catalyst 12' is then contacted with a solution containing one or more second nonaqueous reactive materials 16, 18. In this embodiment, it is preferable that the second nonaqueous reactive materials 16, 18 are not catalysts but are capable of reacting with each other in the presence of catalyst 12'. The gel network 10 containing the catalyst 12' is exposed to conditions sufficient for at least part of the catalyst 12' to efflux from the polymer gel network 10 and to contact the second nonaqueous reactive materials 16, 18. A catalyzed polymerization reaction will occur, substantially on the outer surface 21 of the polymer gel network 10 to form encapsulated layer 20, i.e. an encapsulated gel 14. As discussed above, it is believed that this reaction is self-limiting in the same way as the encapsulation reaction shown in FIG. 1(a).

In sum, a polymeric gel network is contacted with a first nonaqueous reactive material such that the first nonaqueous reactive material is incorporated within the gel network. The gel network is then exposed to a second nonaqueous reactive material under predetermined conditions so that a polymer layer or encapsulation layer is formed on an outer surface of the gel network. The polymer layer acts as a barrier and allows the gel to hold a sufficient amount of the first nonaqueous reactive material such that when the encapsulated gel is placed in a substance with which the first nonaqueous reactive material would typically react, no reaction occurs. Under predetermined conditions described below in Section VII, the integrity of the encapsulation layer may be effectively compromised in such a manner that the first nonaqueous reactive material is released from the previously encapsulated gel, thereby initiating a reaction between the first and second nonaqueous reactive materials to form a product.

The present methodology will provide a means for making a polymeric product using materials that cannot now currently produce the product. For example, because of its extreme reactivity at room temperature, or its extreme volatility, it may not now be possible to use a particular compound in a polyurethane reaction. The present method of encapsulation will enable a polymeric product to be formed using the material. It will be appreciated that the present methods and compositions are is applicable to any nonaqueous reactive materials that, where combined, form a desired product.

A. Responsive Gels

Preferred three dimensional polymer gel networks are responsive gel networks.

The term "responsive gel", in the present context, refers to three-dimensional, polymer gel networks that are capable of incorporating a nonaqueous reactive material into the interstitial spaces of the gel network, with a concomitant increase in gel volume. The term "responsive" is also more specifically meant to refer to three-dimensional, permanently crosslinked gel networks known in the art to undergo volumetric changes as an external environmental condition (e.g., temperature, pH, electric field, fight intensity and wavelength, pressure, ionic strength) is changed. The polymer gel network contracts and/or expands in volume. The volume of such a gel may, under certain circumstances, change by a factor as large as several hundred when the gel is presented with a change in external conditions.

It is well known in the art that hydrogels will exhibit these volumetric change phenomena. See, for example, Tanaka, *Physical Review Letters*, Vol. 40, No. 12, pp. 820–823 (1978); Tanaka et al, *Physical Review Letters*, Vol. 38, No. 14, pp. 771–774 (1977); Tanaka et al, *Physical Review Letters* 5, Vol. 45, pg. 1636 (1980); Ilavsky, *Macromolecules*, Vol. 15, pg. 782 (1982); Hrouz et al, *Europ. Polym. J.*, Vol. 17, pg. 361 (1981); Ohmine et al. *J. Chem. Physics*, Vol. 8, pg. 6379 (1984); Tanaka et al, *Science*, Vol. 218, pg. 462 (1982); Ilavsky et al. *Polymer Bull.* Vol. 7, pg. 107 (1982); Gehrke, *Responsive Gels:Volume Transitions* II; ed. K. Dusek, Springer-Verlag, New York, pp. 81–144 (1993); Li et al., *Ann. Rev. Mat. Sci.*, 22: 243–277 (1992); and Yu et al., *Enzyme Microb. Technol.*, 15: 354–366 (1993), all of which are incorporated herein by reference.

There is, however, relatively limited literature concerning responsive lyogels. Ansaka, et al, *Macromolecules*, 25, 4928 (1993) showed a volumetric change in a poly(4-vinylpyridine-styrene) gel in benzene, although an electron donor molecule needed to be dissolved in the benzene. Shiomi, et al, *Joint Symposium on Polymer Gels and Networks*, Soc. Polymer Science Japan, p.40 (1993), which is incorporated herein by reference, showed that polystyrene/polydimethylsiloxane networks were also characterized by volumetric changes as the solvent percentage compositions were changed in mixtures of MEK and cyclohexane, benzene and THF, and methanol and THF.

We have discovered, that, in contrast to gels undergoing volumetric changes in hydrocarbon solvents, gels may also exhibit volumetric change phenomena in highly reactive, organic fluids such as isocyanate solutions and polyol solutions. Therefore, particularly preferred "responsive" polymer gel networks encompassed within the present invention and encapsulated using the present methods are not hydrogels at all, but are polymer gel networks that are both hydrophobic and lyophilic.

The responsive gels may also be "reversibly responsive", i.e., when challenged with an environmental change, the environmental change affects the gel by causing the entire gel, or a component thereof, to undergo a reversible volumetric change. It is preferred that the gel undergo a reversible volumetric change of at least 20 percent in response to a change in an environmental condition, in which the gel expands from a less liquid-filled state or dry state at a lower temperature to a more liquid-filled state; or collapses from a more liquid-filled state to a less liquid-filled state. The reversible volume change involves a shift between two equilibrium states (i.e., swollen and collapsed). The reversible volume change of the entire gel, or a component thereof, may be either continuous or discontinuous. A "continuous" volume change is marked by a reversible change in volume (i.e. a collapse or swelling) that occurs over a relatively large change in environmental condition. Moreover, there exists at least one stable volume near the transition between the swollen and collapsed states. Gels may undergo a "discontinuous" volume change in which the reversible transition from swollen to collapsed states, and back again, occurs over an extremely small change in environmental condition, such as less than 0.1° C. or 0.1 pH unit. Such reversible gels are hereinafter called "phase-transition" gels. There is no stable volume between the swollen and collapsed states at the phase-transition and, in theory, the expansion and/or collapse occurs over an infinitely small environmental change. A gel undergoing a continuous phase-transition may have a similar order of magnitude total volume change as a gel undergoing a discontinuous phase-transition.

On a molecular level, the phase transition gels are sensitive to small changes in a restricted repertoire of environmental "trigger" conditions consisting primarily of temperature. Trigger conditions are not so limited, however, and may also include pH, solvent concentration, and ion concentration. On a macroscopic level, any of a variety of environmental conditions may be imposed on the gel which allow the specific trigger to induce a phase-transition. These environmental conditions may, but not necessarily, be the same as the trigger and include, but are not limited to, a change in temperature, electric field, photon energy, pH, solvent composition, ion concentration, concentration of biomolecules, pressure, and the like.

The gels may be combined with a material that acts as a molecular "transducer", converting an environmental condition into an appropriate trigger. For example, a dye may be introduced into a temperature-triggered fast response gel. The dye is designed to absorb light of a given energy and convert the light energy into heat, thus triggering the gel to undergo a temperature induced rapid phase-transition. See also, A. Suzuki and T. Tanaka, Nature: 346: 6282 (1990), incorporated herein by reference.

The volumetric changes of gels described herein result from competition between intermolecular forces, usually electrostatic in nature, that act to expand the polymer network; and at least one attractive force that acts to shrink it. Volumetric changes in gels are believed to be driven primarily by four fundamental forces: ionic, hydrophobic, hydrogen bonding and van der Waals bonding interactions, either alone or in combination. Each of these interactions may be independently responsible for a volume transition in preferred gels of the invention. Each of these fundamental forces is most strongly affected by a particular trigger. Changes in solvent concentration most strongly affect the van der Waals interaction; changes in temperature most strongly affect hydrophobic interactions and hydrogen bonding; and changes in pH and ion concentration most strongly affect ionic interactions.

Gels may be formulated in which the volume change is governed by more than one fundamental force. In particular, gels consisting of copolymers of positively and negatively charged groups meet this requirement. In these gels, polymer segments interact with each other through ionic interactions and hydrogen bonding. The combination of these forces results in the existence of several pH-driven phases. See Annaka and Tanaka, Nature 355: 430–432 (1992), incorporated herein by reference. An exemplary gel of this type is a copolymer of acrylic acid and methacryl-amidopropyl-trimethyl ammonium chloride (MAPTAC). For a summary of the properties of responsive hydrogels, see U.S. Pat. Nos. 4,732,930; 4,912,032; and 5,242,491, incorporated herein by reference.

III. POLYMER GEL SYNTHESIS

Gel precursors suitable for use in accordance with the present invention include various cross linked polymers, which are set forth in greater detail herein. Alternatively, the gel precursor may be synthesized from the polymerization of a monomer and a crosslinking agent. The synthesis may also include the use of an initiator and/or a promoter.

A. Gel Precursors

In principle, a gel can be made from any polymer with side groups that can react with a di- or multi-functional crosslinking molecule (typically in a covalent reaction, but physical interactions will also work). The simplest systems from which gels can be made are polymers with hydroxyl, acid or amine side groups. Nevertheless, certain design rules are necessary for the present methods and compositions used with highly reactive materials.

Reactive materials (i.e., isocyanates) can be characterized by the types of chemicals with which they will react or which will catalyze their reactions. As an example, isocyanates will react with substances containing an active hydrogen, a class of materials including water, alcohols, primary and secondary amines, acids, mercaptans and amides formed from primary amines. Isocyanates can also react with some of the reaction products of isocyanates such as urethanes and ureas. The rate and degree of reaction with these materials can vary greatly from material to material. Thus, a gel of N-isopropylacrylamide (NIPA) is not preferred for use as a gel capsule for isocyanates. Nevertheless, NIPA gels would be suitable for encapsulating multifunctional amines (See Example 5) and catalysts (See Example 6).

It is exceedingly desirable in designing gels and gel precursors for encapsulation of nonaqueous reactive materials, especially organic materials, to avoid any gel/gel precursor component with which the nonaqueous reactive material can react or which will catalyze reaction or decomposition of the nonaqueous reactive material. Hydrogels that are well known in the literature, which include polyacrylic acid, polyvinyl alcohol, acrylamide, substituted acrylamides and cellulose ethers, such as hydroxypropyl cellulose (HPC) and hydroxypropyl methyl cellulose (HPMC), contain active hydrogens and therefore are not ideally compatible with nonaqueous reactive materials such as isocyanates.

Some gel precursors are known, however, which do not contain an active hydrogen. These materials include disubstituted acrylamides such as poly (N,N-disubstituted acrylamides) like dimethyl acrylamide, diethyl acrylamide and morpholine acrylamide; acrylates, such as methyl acrylate, ethyl acrylate, propyl acrylate, butyl acrylate and 2-ethylhexyl acrylate; and substituted vinyl ethers, such as methyl vinyl either and ethyl vinyl ether, polyacrylate ethers, polyglycol ethers. These materials can exist in the presence of isocyanates and not cause reaction.

It is also important that the polymer gel network and/or gel precursor not catalyze decomposition of the nonaqueous reactive material. As an example, vinyl pyridine contains no active hydrogen. However, as a tertiary amine, it can catalyze autopolymerization of isocyanates and so must be considered unsuitable for encapsulating isocyanate. It is also important that the gel network be sufficiently lyophilic relative to the nonaqueous reactive material so that the gel is compatible with, and incorporates (e.g. by swelling) the nonaqueous reactive material. Polyethylene, polystyrene and polyvinylchloride contain no active hydrogens and do not catalyze decomposition of isocyanates. We have found, however, that for certain isocyanates, networks containing polyethylene, polystyrene and polyvinyl chloride are not lyophilic. For these reasons, these substances must be considered unsuitable gel networks for those isocyanates.

Finally, there must be no undesirable residue carried over within the gel network from the gel manufacturing process. As an example, crosslinked poly(dimethylacrylamide) is conveniently synthesized from water solution and the result is a hydrogel. When the water is removed, there is a certain quantity of "bound" water surrounding the gel network, which requires additional effort and work to remove. It is essential that the bound water be completely displaced from the dimethylacrylamide gel network before it is used to incorporate a fast nonaqueous reactive isocyanate. Solvent assisted swelling followed by solvent assisted collapsing can be used in these circumstances. See Example 1.

These rules apply to minor components of the gel network as well as major components. For example, BIS (bis methylene acrylamide) is commonly used as a crosslinker for gel networks in concentrations from 0.01 to 5% by weight of solids. Our work has shown that, as a substituted amide present in small concentrations, BIS can be used together with dimethylacrylamide for gels for encapsulating isocyanate. However, it is preferred to use crosslinkers such as DEGDA (diethyleneglycoldiacrylate) which contain no active hydrogen.

Gel precursors suitable for use in accordance with the present methods and compositions are therefore well defined and include any components which satisfy the following criteria:

1) the gel network precursor and gel network must not react with or catalyze decomposition or reaction of the nonaqueous reactive material(s), i.e., the gel precursor and/or gel network contains no reactive groups;
2) the gel network must incorporate the nonaqueous reactive material into the network; and
3) there must be no undesirable residue (i.e. a residue that will react with the nonaqueous reactive material and/or will catalyze the reaction or decomposition of the nonaqueous reactive material) present from the synthesis of the gel network itself.

Various polymers which satisfy these criteria for specific reactive chemicals are listed below, together with crosslinking agents and the like. These should be considered as illustrative and not restrictive.

1. Exemplary gels and gel precursors

Gels may consist, in whole or in part, of polymers made by copolymerization/crosslinking of monofunctional and polyfunctional polymerizable vinyl monomers. While not to be construed as limiting, the monomer may include N,N-disubstituted acrylamides such as N,N-dialkylsubstituted acrylamides, or di-N,N substituted acrylamides where the disubstitution form part of a ring, acrylate ethers, alkyl substituted vinyl ethers, glycol ethers, and mixtures thereof.

Exemplary polymeric gel networks thus may contain poly (N,N-dialkylacrylamide), poly(ethyl acrylate) and mixtures thereof, as well as polymers of N-alkylacrylamide (or analogous N-alkylmethacrylamide) derivatives such as N-ethylacrylamide, N-n-propylacrylamide, N-n-propylmethylacrylamide, N-isopropylacrylamide, N-n-isopropylmethylacrylamide, N-cyclopropylacrylamide, or acrylate (or analogous methacrylate) copolymers like hydroxypropyl acrylate-co-acrylamide, diacetone acrylamide-co-hydroxyethyl acrylate, hydroxypropyl acrylate-co-hydroxyethyl acrylate, ethylacrylamide, cyclopropylacrylamide, n-propylacrylamide, and isopropylacrylamide.

Gels may be prepared from synthetic starting materials using linear polymers that are capable of being crosslinked. Although many of the following gels contain a reactive hydrogen, the following gels may be compatible with multifunctional diamines and may be made by crosslinking linear polymers through physical interactions as in the poly(vinyl alcohol)-poly(acrylic acid) or poly(ethylene glycol)-poly(methacrylic acid) systems, in which these hydrophobically modified polyethylene glycols and similar polymers can associate through strong hydrophobic interactions. Examples are poly(ethylene glycol)-poly(methacrylic acid) or poly(vinyl alcohol)-poly(acrylic acid).

Similarly, natural polymeric precursors that may be chemically cross-linked may also be used in the invention. Exemplary polymers, some of which contain reactive hydrogens, but that may be conveniently used with, for instance diamines according to the invention, include precursors such as alkyl-substituted cellulose derivatives like cellulose ethers. Exemplary cellulose ethers include methylcellulose, hydroxyethylcellulose, methylcellulose, and hydroxypropylcellulose, hydroxypropylmethycellulose, hydroxypropylcellulose, carboxymethylcellulose and hydroxymethylcellulose. Polymers such as polyvinylalcohol, polyethylene glycol, polypropylene glycol, and poly(hydroxypropyldextran) are also suitable. Polypeptides like poly(L-proline), and poly(valine-proline-glycine-X-glycine), [where X-tyrosine, phenylalanine, leucine, valine, glutamic acid, lysine, glycine, and other amino acids] may also be used.

2. Exemplary Chemical Crosslinkers

Exemplary crosslinking agents may include: ethylene glycol diacrylate (EGDA); di(ethylene glycol)bis(allyl carbonate) ("DEGBAC"); methylenebis(acrylamide) ("bis"); ethylene glycol dimethacrylate ("EGDMA"); magnesium methacrylate ("MgMA$_2$"); and mixtures thereof. Di(ethylene glycol)bis(allyl carbonate) ("DEGBAC") and ethylene glycol dimethacrylate ("EGDMA") are commercially available from Aldrich Chemical Company.

The gel precursor is crosslinked and is most preferably chemically cross-linkable. Any reagent which can react with two or more groups on the monomer or polymer precursors can function as a crosslinker and convert that starting material to a gel. Cross-linkers suitable for polymeric precursors may include diglycidyl ether, divinyl sulfone, epichlorohydrin, phosphoryl chloride, trimetaphosphate, trimethylomelamine, polyacrolein, and ceric ion redox systems, although the most preferred of these will not have active hydrogens. The concentration of crosslinkable material is generally about 0.1 to about 10 mole percent based upon the polymerizable material which is the main component. The crosslinking agent effects partial crosslinking of the polymer and provides a means to control the mechanical strength, of the gel swelling degree, and intensity of volume change trigger by changing the crosslinking density. Crosslinking of linear polymers by chemical reagents is preferred for gels made from biological polymers such as cellulose ethers. Preferred crosslinkers for polysaccharide gels, especially cellulose ethers, are multifunctional carboxylic acids, such as adipic acid (hexanedioic acid: HOOC$(CH_2)_4$COOH), succinic acid (HOOC$(CH_2)_2$COOH), malonic acid (propanedioic acid: $CH_2(COOH)_2$, sebacic acid (decanedioic acid: HOOC$(CH_2)_8$COOH), glutaric acid (pentanedioic acid: HOOC$(CH_2)_3$COOH), or 1,10 decanedicarboxylic acid. Dicarboxylic hydroxyacids such as tartaric acid and malic acid as well as multifunctional carboxylic acids such as 1,2,3,4-butanetetracarboxylic acid may also be suitable.

3. Exemplary Catalysts

Depending on the type of polymerization or crosslinking reaction, different types of catalysts may be required. For example, for polymerizing vinyl monomers, polymerization initiators, such as a free radical initiator, i.e. ammonium persulfate or sodium metabisulfite, are usually required in the present methods. For acid-base crosslinking reactions, catalysts such as hydroxide that will catalyze reactions with polyvinylsulfone may be required.

B. Nonaqueous Reactive Materials Incorporated into the Gel Network

While not intended to be limiting, the gel network may have incorporated therein nonaqueous reactive materials such as: isocyanates, multifunctional amines such as di- or triamines, organometallics, acyl halides, acrylates, polyols, acids, acid anhydrides, and mixtures thereof. More specific examples of such nonaqueous reactive materials include: the isocyanurate form of trimeric hexamethylene diisocyanate, 1,6-diisocyanatohexane ("HMDI"), poly(propylene glycol) bis(2-aminopropyl ether) ("PPGBAE") which is commercially available from Aldrich Chemical Company under the trade name JEFFAMINE®, adipoyl chloride ("ACI"), phenyl isocyanate ("PI"), and mixtures thereof.

C. Nonaqueous Reactive Materials External to the Gel Network

While not meant to be limiting, the nonaqueous reactive material disposed external to the gel, and which reacts with the incorporated material in the gel, may include polyols, polyamines, isocyanates, acids, organometallics, acid hydrides, and mixtures thereof. For instance, one polyol suitable for use is an oligomeric product composed of the ester formed from adipic acid and 1,4-cyclohexane dimethanol. Another nonaqueous reactive material may be poly (propylene glycol)bis(2-aminopropyl ether) ("PPGBAE"), available from Aldrich Chemical Company, St. Louis, Mo.).

While each of the following components may not be preferred for incorporation into every gel, or for use external to every gel, the components are provided to illustrate the type of nonaqueous reactive materials that may be used in the present invention. Those skilled in the art will, based on the design criteria set forth above and based on the experimental protocols set forth herein, readily ascertain if any particular nonaqueous reactive material is suitable for use in the invention.

Suitable isocyanates include any diisocyanates or polyisocyanates or mixtures thereof. Such compounds include aliphatic, cycloaliphatic, araliphatic, aromatic and heterocyclic polyisocyanates. Other exemplary isocyanates include 4-methyl-1,3-phenylene diisocyanate, TDI, and its dimers known under the trademark DESMODUR TT® (Bayer); 1,6-hexamethylene diisocyanate and its oligomers; 1-isocyanato-3-isocyanatomethyl-3,5,5-trimethyl-cyclohexane (isophorone diisocyanate); 4,4'-diisocyanato dicyclohexylmethane and its oligomers; 1,5diisocyanato-2-methylpentane and its oligomers; 1,12-diisocyanatodedecane and its oligomers; and 1,4-diisocyanatobutane and its oligomers.

Multifunctional amines are also suitable nonaqueous reactive materials and are generally di-functional or higher, low molecular weight or relatively high molecular weight compounds containing aliphatically bound primary and/or secondary amino groups and having molecular weights of from 60 to about 6000 and preferably from 60 to 3000. The preferred nonaqueous reactive amines are low molecular weight and/or relatively high molecular weight primary and/or secondary polyamines, preferably diamines. As used herein, the term "aliphatically-bound" amine groups is meant to include amino groups attached to aliphatic groups (including cycloaliphatic groups) or to the aliphatic residue of araliphatic groups or in non-aromatic heterocyclic tings. In addition to the amino groups, the aliphatically-bound di- and polyamines may also contain OH-groups, tertiary amino groups, ether groups, thioether groups, urethane groups, urea groups, carboxyl groups or carboxylic acid alkylester groups.

Diamines and polyamines suitable for use may include, for example, ethylene diamine; 1,2- and 1,3-propane diamine; 1,4-butane diamine; 1,6-hexane diamine; neopentane diamine; 2,2,4- and 2,4,4-trimethyl-1,6-diaminohexane; 2,5-dimethyl-2,5-diaminohexane; 1,10-decane diamine; 1,11-undecane diamine; 1,12-dodecane diamine; bisaminomethylhexahydro-4,7-methano-indane (TCD-diamine); 1,3-cyclohexane diamine; 1,4-cyclohexane diamine, 1-amino-3,3,5-trimethyl-5-amino-methyl cyclohexane (isophorone diamine); 2,4- and/or 2,6-hexahydrotolyllene diamine; 2,4'- and 4,4'-diaminodicyclohexyl methane; m- or p-xylylene diamine; bis-(3-amino-propyl)methylamine; bis-N,N'-(3-aminopropyll)-piperzaine; diaminoperhydroanthracenes; 1-amino-2-aminomethyl-3,3,5-(3,5,5)-trimethylcyclopentane; 2,2-dialkylpentane-1,5-diamines; triamines, such as 1,5,11-triaminoundecane; 4-aminomethyl-1,8-diaminooctane; lysine methyl ester and cycloaliphatic triamines as described in German Offenlegungsschrift No. 26 14 244; 4,7-dioxadecane-1,10-diamine; 2,4- and 2,6-diamino-3,5-diethyl-1-methylcyclohexane and mixtures thereof; alkylated diaminodicyclohexylmethanes, for example 3,3'-dimethyl-4,4'-diaminodicyclohexylmethane or 3,5-diisopropyl-3',5'-diethyl-4,4'-diaminodicyclohexylmethane; perhydrogenated diaminonaphthalenes; perhydrogenated diaminoanthracenes; higher amines, such as diethylene triamine, triethylene tetramine, pentaethylene hexamine, dipropylene triamine and tripropylene tetramine; N,N'-dimethyl ethylene diamine, 2,5-dimethyl piperzine; 2-methyl piperzine; piperzine (hydrate); and 2-hydroxyethyl piperazine.

In addition to or in admixture with these relatively low molecular weight aliphatic diamines (by "relatively low molecular weight" compounds containing aliphatically-bound amino groups, is meant molecular weights of less than 400) it is also possible to use relatively high molecular weight aliphatic di- and polyamines (i.e., molecular weights of 400 or more) of the type obtainable, for example by the reductive amination of polyoxyalkylene glycols with ammonia in accordance with Belgian Pat. No. 634,741 or U.S. Pat. No. 3,654,370. Other relatively high molecular weight polyoxyalkylene polyamines may be obtained by methods of the type described in the Company Publication entitled "Jeffamine, Polyoxypropylene Amines" by the Texaco Chemical Co., 1978; by the hydrogenation of cyanoethylated polyoxypropylene glycols (German Offenlegungsschrift No. 11 93 671); by the aminiation of polypropylene glycol sulfonic acid esters (U.S. Pat. No. 3,236,895), by the treatment of a polyoxyalkylene glycol with epichlorohydrin and a primary amine (French Pat. No. 1,466,708); or by the reaction of NCO-prepolymers with enamines, aldimines or ketimines containing hydroxyl groups, followed by hydrolysis in accordance with German Auslegeschrift No. 25 46 536. Other suitable relatively high molecular weight aliphatic di- and polyamines are the polyamines obtainable in accordance with German Offenlegungsschriften Nos. 29 48 419 and 30 39 600 by the alkaline hydrolysis of NCO-prepolymers (with aliphatic diisocyanates) with bases via the carbamate stage. These relatively high molecular weight polyamines have molecular weights of from about 400 to 6000, preferably from 400 to 3000 and, more preferably, from 1000 to 3000.

By virtue of their structure, relatively high molecular weight polyamines such as these are particularly suitable for the formation of a polyurea encapsulation layer. The reaction leading to gel encapsulation are carried out at temperatures below the melting temperature of the particular nonaqueous reactive materials and are generally at temperatures below 70° C., preferably at temperatures in the range from 0° to 50° C.

The nonaqueous reactive material may also consist of organic compounds containing one or, preferably more hydroxyl groups and having molecular weights of from 62 to 6000. However, it is preferred to use relatively high molecular weight polyols having molecular weights in the range from 400 to 6000, preferably in the range from 400 to 3000 and, more preferably, in the range from 1000 to 3000, optionally in conjunction with low molecular weight polyols.

Examples of useful monoalcohols include relatively low-chain alcohols, such as isohexadecanol, and, propoxylation products of monohydric alcohols, said propoxylated products having molecular weights of preferably, from 4000 to 6000, (for example propoxylation products of n-butanol). Suitable low molecular weight polyols include, for example, 1,4-butane diol, 1,10-decane diol, tetra-(hydroxypropyl)-ethylene diamine or castor oil. The preferred relatively high molecular weight polyols (i.e., molecular weights of from 400 to 6000) include for example, polyoxyalkylene polyols, such as polyoxytetramethylene glycols or ethoxylation and/or propoxylation products of low molecular weight diols, polyols, diamines and polyamines. Examples include propoxylated trimethylol propane, propoxylated ethylene diamine or linear or branched polypropylene glycol ethers which may contain ethylene oxide is statistical, block-like or terminal form.

One embodiment, for example is characterized by the use of difunctional or higher, relatively high molecular weight polyols as a nonaqueous reactive material of the invention. When used in the synthesis of polyurethanes, these polyols are directly employed as reactants containing hydroxyl groups. Accordingly, it is also possible to use any relatively high molecular weight compounds containing OH-groups normally used for the synthesis of polyurethanes as the such as polyethers, polyacetals, polythioethers and even polyesters of the type described, for example, in German Offenlegungsschrift No. 29 20 501.

IV. METHODS OF MAKING POLYMERIC GEL NETWORKS

A. General Protocol

Polymerization is initiated using a polymerization initiator, e.g., a free radical initiator such as ammonium persulfate, sodium metabisulfite or the like, preferably with dilution with an appropriate solvent, e.g., dimethylsulfoxide. However, neither the solvent nor the polymerization initiator are always important factors to obtain the polymerized product from the monomer mixture, and any method suitably selected from conventionally well-known gelation methods may be applied.

Monomer starting materials are suitable, although polymeric starting materials are also suitable. When monomeric precursor units are used in the methods of the invention, the polymer is formed simultaneously with polymer crosslinking. A general protocol for forming a gel of the present invention using a crosslinkable, linear polymer starting material includes the steps of dissolving dry linear starting material polymer(s) in a suitable solvent and allowing the polymer(s) and solvent to mix. A crosslinking agent is then added to the polymer solution and the solution and crosslinker are further mixed together. The resulting solution may be poured into a solid mold (i.e., between two glass plates) and the crosslinking reaction carried out at a given temperature regime. The gel solution may also be formed into beads or spheres using crosslinking in a non-solid mold where the reacting solution (polymer precursor, crosslinker and catalysis, if needed) is dispersed in a non-solvent to form a droplet. The solution reacts within the droplet to form a bead. In this method, the non-solvent may be considered to be a "mold" for droplets. See e.g., U.S. Pat. No. 3,953, 360, incorporated herein by reference.

Gels may also be made by physically crosslinking polymerics. For example, polyvinyl alcohol and polyacrylic acid interact via extremely strong, non-covalent bonding that is essentially irreversible. Gels may also be made by photochemical crosslinking such as exemplified by use of ultraviolet light. Nevertheless, preferred are chemically crosslinked polymer gel networks. "Chemically crosslinked" means that a chemical reagent is added during synthesis which reacts with two or more polymer chains. The term "crosslinked" is meant to include gamma radiation crosslinking as well as photochemical, electron beam, or ultraviolet cross-linking.

The preferred synthesis of an encapsulated gel network from a monomer gel precursor in the present invention includes mixing the monomer with a crosslinking agent, thereby forming a first solution. The monomer and crosslinking agent may alternatively be mixed in the presence of a solvent. The first solution is then sealed and subjected to degassing or deaeration for a predetermined period of time. See Examples 1 et seq. A second solution containing initiators and/or promoters may then be added to the first solution.

Preferred solvents (for a monomer and crosslinking agent) include dimethylsulfoxide ("DMSO"), water, ethanol, toluene, THF, dimethylformamide and MEK. The monomer and crosslinking agent solution may be subject to degassing or deaerating by bubbling with an inert gas such as nitrogen for a period of time long enough to ensure an absence of oxygen and water. An initiator such as 2,2'-azobis(2-methylpropionitrile) or ammonium persulfate available from Eastman Kodak Company, Rochester, N.Y. may be added to the monomer and crosslinker solution. Alternatively, benzoyl peroxide in ethyl acrylate may be added as an initiator. A promoter such as N,N,N',N'-tetramethylethylenediamine (available from Polysciences,) may be included with the initiator. It should be appreciated, however, that the initiators and promoters listed above are exemplary only and that other known initiators and promoters are suitable for use in accordance with the present invention. The initiators and/or promoters may be dissolved with a suitable solvent and/or combined with a solvent such as dimethylsulfoxide ("DMSO") prior to being added to the monomer and crosslinker solution.

V. INCORPORATION OF NONAQUEOUS REACTIVE MATERIAL INTO THE GEL NETWORK

The synthesized gel network is washed and collapsed prior to incorporation with a nonaqueous reactive material, primarily to remove undesirable solid or liquid residue from the gel network. The gel precursor may be sectioned and the sections washed with an excess of a gel displacing agent in which the gel is capable of swelling. For example, the gel network is sectioned into several pieces and then washed, and subsequently swollen, with acetone. The gel network is then collapsed utilizing an excess of a gel collapsing agent such as toluene. Collapse of the gel will disgorge contents contained within the gel network so that washing and collapsing the gel in this manner removes fluid or other impurities from within the gel network. It should be understood that other materials which are capable of causing the gel component to swell and collapse are suitable for use in this methodology.

Gel particles of proper size and purity are swelled with a reactive material. This can be done by placing the gel in an excess of reactive material which is to be swelled. The gel which is dry and solvent-free is then placed in an excess of a first nonaqueous reactive material to be incorporated therein. The gel is designed to swell in the presence of the first nonaqueous reactive material. Preferably, incorporation of the first nonaqueous reactive material is performed at room temperature. It may be desirable, however, to incorporate the first nonaqueous reactive material at an elevated temperature to accelerate the process.

To facilitate the swelling process, an accelerator may be utilized. While not meant to be limiting, ketones, ethers, and cyclic ethers are suitable swelling agents. For example, tetrahydrofuran ("THF") or methyl ethyl ketone ("MEK") may be used as cosolvent and diluent for the reactive material to increase or facilitate the swelling process. Preferably, the swelling accelerator agent is a solvent having a molecular weight of less than 1000, and more preferably less than about 100. The swelling accelerator agent preferably is vacuum stripped or removed from the gel after swelling is completed. See Example 4.

VI. GEL ENCAPSULATION

The swollen gel is placed into contact with an excess of encapsulating material (i.e., a second nonaqueous reactive material) for a time sufficient to allow formation of the encapsulation layer. This is accomplished by allowing a portion of the first nonaqueous reactive material incorporated within the gel network to efflux and react with the second nonaqueous material (see FIG. 1(a)). The encapsulating material should be selected based upon the nonaqueous reactive chemicals to be encapsulated. While not meant to be limiting, if an isocyanate is being encapsulated, the encapsulating material may be a polyol, a polyamine, or mixtures thereof.

Figure 2:
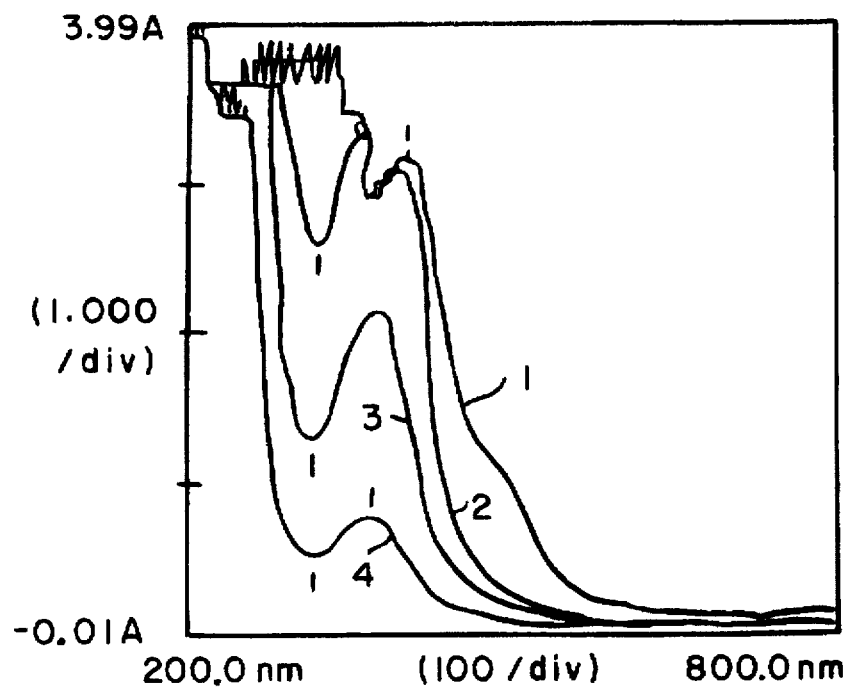
FIG. 2 is an absorbance spectrum of a solution of a phenol red dye-isocyanate (dye-tagged isocyanate) in dimethylsulfoxide (DMSO) which illustrates the occurrence of a dye-isocyanate reaction.

The encapsulating layer may alternatively be formed by contacting a gel with a second nonaqueous reactive material for a predetermined time period and thereafter contacting the gel with another second nonaqueous reactive material (see, for instance, reference numbers 16 and 18 in FIG. 1(b)) such that a reaction occurs between the two second nonaqueous reactive materials on the outer surface of the gel network. Exposure to the other second nonaqueous reactive material may be by dropwise addition into the mixture containing the gel network (see FIG. 2(b)), or by sequential contacting of the gel in the second reactive material, followed by contacting in additional second reactive material. For purposes of illustration, poly (N,N-dialkylacrylamide) gel particles swollen with isocyanate may be allowed to react with polyamine or polyol, removed therefrom and then placed in an isocyanate such that a polyurea or polyurethane encapsulated layer is produced. The process may be repeated until a desirable encapsulation thickness is obtained.

The second nonaqueous reactive material preferably is mixed with a catalyst such as dibutyltin dilaurate (available from Aldrich Chemical Company). The swollen gel network may be placed in the catalyst/second nonaqueous reactive material mixture and periodically agitated at room temperature until signs of hardening in the second nonaqueous reactive material/catalyst solution become visible. The encapsulated gel is then separated from the reaction materials using standard methods such as centrifugation, filtration and the like.

In order to insure that the gel network is encapsulated with a sufficient thickness of encapsulating layer, the gel preferably is placed in a sealed container with a fresh second nonaqueous reactive material/catalyst mixture. The mixture preferably is maintained at room temperature and periodically agitated. The encapsulating layer is deemed of sufficient thickness when no further hardening of the liquid surrounding the gel particles is observed.

The present invention may be utilized to produce a variety of encapsulated polymer gel networks. Gels which possess hydrophobic and lyophilic properties may also be produced according to the invention. In this embodiment, the gel remains intact in the presence of water, i.e., the encapsulated nonaqueous reactive material does not diffuse or transverse the encapsulation layer and the water does not appear to substantially diffuse or traverse the encapsulation either. In the presence of a compatible solvent, however, the encapsulated nonaqueous reactive material is released and reacts with the solvent.

Without intending to be bound by any theory, it is believed that the ability of the encapsulated gel network to retard effusion of the fast reactive material and to retard infusion of material(s) external to the gel is not only a function of the permeability resistance of the encapsulation layer. In the case of water and the compatible solvent, the swelling of the gel network by the compatible solvent clearly illustrates the permeability of the encapsulation layer. However, the non-permeability of the water suggests that the hydrophobicity of the gel network and the encapsulating layer is an additional factor contributing to the effectiveness of the encapsulation.

The present method used for nonaqueous media is not the only means for gel encapsulation. It will be understood that persons having ordinary skill in the art may, using the techniques, design rules and protocols developed herein, adapt other methods such as in-situ polymerization, two component nozzle polymerization, centrifugal polymerization, spray drying, fluid bed drying and rotational suspension separation encapsulation to encapsulate highly reactive nonaqueous materials in gels.

VII. RELEASE OF ENCAPSULATED NONAQUEOUS REACTIVE MATERIAL

The encapsulated gels may be stored as particles in bulk form or alternatively, in solution. Storage as solid particles, e.g. pellets, may be desirable for shipping, distribution and storage due to reduced volume and weight. If stored in solution, the solvent may be, or may contain, a material which is capable of reacting with the encapsulated first nonaqueous reactive material when the latter is disgorged from the gel.

In general, the encapsulated gel network is exposed to conditions sufficient for the encapsulation layer to be compromised. The term "compromised" means that all, or a portion, of the encapsulation layer is broken or otherwise disrupted so that the internal contents of the gel network may come into contact with any materials external to the network.

For instance, an encapsulated gel network is placed in an excess of a solvent ("swelling solvent") which is capable of compromising the encapsulation layer or coating. A swelling of the gel particles occurs and is followed by the release of the encapsulated material. The swelling solvent may be selected from a variety of solvents. For example, acetone, methyl ethyl ketone, tetrahydrofuran ("THF") and the like are suitable swelling solvents so long as a sufficient swelling of the gel and release of the encapsulated material occurs.

The encapsulated material may also be released by shear. For instance, encapsulated gel particles may be placed into a valve or the like and subjected to pressure such that the particles are sheared in the valve, thereby rupturing and producing small gel pieces. The encapsulated particles may also be released by other applications of shear. For example, the gel particles may be sectioned into a plurality of pieces having diameters of several microns. The encapsulated material may be also the released by any of the other methods used to induce volume change in responsive gels, including subjecting the gel network to a change in temperature, acidity, or basicity, ion or ionic strength, light, pressure and the like, (See U.S. Pat. Nos. 4,732,930, 4,912, 032, et al. supra) provided the change in condition does not affect the gel network in some deleterious manner.

VIII. THERMORESPONSIVE LYOGELS

The present invention also provides methods and gel compositions which undergo temperature-induced transitions from a collapsed state to an expanded state in neat organic solvents. The gels networks may be opaque in the collapsed state and transparent in the expanded state and the transition from the collapsed, opaque state to expanded, transparent state occurs because of a change from a lower to a higher temperature. See Examples 16–21.

This thermoresponsive gel network may be formed in a manner similar to that discussed above, e.g., by deaerating a mixture of monomer and crosslinker and adding an initiator and/or promotor.

IX. UTILITIES AND APPLICATIONS

As previously discussed, the encapsulated gels of the present invention are suitable for storage and subsequent use in forming a variety of useful products.

For purposes of illustration only, encapsulated gels formed in the present invention may be used in injection molding processes to apply a coating or a paint layer on the molded article while the article is still in the mold.

A gel may be inserted in a spray gun, for example, and immersed in a liquid capable of reacting with the encapsulated first nonaqueous reactive material. Application of pressure by the spray gun compromises the integrity of the encapsulation layer of the gel, releasing the first nonaqueous reactive material and thereby initiating a reaction with the immersion liquid.

One particular example is the use of isocyanate encapsulated within gels formed in accordance with the present invention. The gels may be immersed in a polyol (which may contain dyes, additives and the like) and subsequently placed in a spray gun or the like. Upon application of pressure by the spray gun, the isocyanate is released and reacts with the polyol to form a polyurethane. The polyurethane is sprayed onto the molded article in the mold or on to some other surface to the coated.

In a similar manner, the encapsulated gels may be utilized as adhesives, sealants, laminating materials, electrical coatings and the like. Moreover, encapsulated multi-functional amines released into and contacted with multifunctional epoxy precursors are particularly useful for applications involving coatings and plastic encapsulants. The polymers produced possess excellent heat resistances electrical characteristics and the ability to withstand extreme weather conditions.

It should be appreciated that the methods used to release the encapsulated nonaqueous reactive material and contact another non-encapsulated nonaqueous reactive material may vary depending on the particular application to be employed.

X. EXAMPLES

Reaction of isocyanates can be qualitatively measured by observing the appearance and flow behavior of the isocyanate and/or the solution containing or in contact with the isocyanate. As an isocyanate reacts, its effective molecular weight increases so that it or the solution containing it becomes more viscous. If the isocyanate autopolymerizes, that also will cause it to increase in viscosity or, in some cases, to harden.

Using these criteria, the viscosification or hardening of an isocyanate or isocyanate containing solution will indicate reaction of the isocyanate. Conversely, retention of the initial viscosity and flow properties of the isocyanate can be taken to indicate lack of polymerization reaction. These guidelines were used in evaluating the encapsulation of isocyanates in some of the following examples.

Example 1

(Encapsulation of an isocyanate in a poly (N,N-dialkylacrylamide)-based gel with a polyol)

Encapsulation of poly(N,N-dialkylacrylamide)-based gels preswollen in isocyanates included: synthesizing, washing, and collapsing the gel followed by swelling in isocyanate, measurement of the effective swelling degree of the gel, and exposing the gel to a polyol to obtain a polyurethane layer on the outer surfaces of the gel particles. The encapsulated isocyanate subsequently was released by compromising the integrity of the polyurethane encapsulation layer.

1.1 Gel Synthesis

Exactly 0.73 ml (7 mmol) N,N-Dimethylacrylamide (Aldrich Corporation) and 21 µl di(ethylene glycol)bis(allyl carbonate) (DEGBAC) (Aldrich) were mixed with 9.2 ml dimethylsulfoxide (DMSO) (Aldrich) in a 20-ml vial. The mixture was then sealed with a sleeve serum stopper. The solution was degassed by $N_2$-bubbling for 15 minutes. 100 µl of a solution of 15 mg/ml 2,2'-azobis(2-methylpropionitrile) (Eastman Kodak Company) in DMSO solution was then added to the monomer the solution. The solution was then kept at 70° C. for 20 hours resulting in a transparent gel.

1.2 Gel Washing, Collapsing and Swelling in Isocyanate

The gel prepared as set forth in 1.1 was sectioned into pieces of approximately millimeters in diameter and washed with excess acetone. The washing liquid was discarded and the gel was kept in acetone for about 24 hours. The fully swollen gel then was washed with excess toluene and was allowed to collapse in toluene for 5 days. The collapsed gel was then placed in an excess of an isocyanate containing trimeric hexamethylene diisocyanate (in isocyanurate form-RHONE POULENC, HDTLC) at room temperature for about 24 hours.

1.3 Measurement of Effective Swelling Degree

Several of the gels swollen in the isocyanate were cleaned of excess surface fluid, weighed ($W_s$), washed with excess acetone, and allowed to swell in excess acetone overnight. The swollen gel was dried at 100° C. overnight and then weighed ($W_d$). The effective swelling degree:

$$S = (W_s - W_d)/W_d \times 100$$

was measured to be 700±100%.

1.4 Formation of Polyurethane Encapsulation Layer Formation

Gels swollen in trimeric hexamethylene diisocyanate (in isocyanurate form) were surface cleaned, weighed ($W_1$), and placed into an excess mixture of an oligomeric product composed of the ester formed from adipic acid and 1,4 cyclohexane dimethanol (POLYOL) and dibutyltin dilaurate catalyst (1 weight %). An oligomeric product composed of the ester formed from adipic acid and 1,4 cyclohexane dimethanol is available from KINJ Industry (K-FLEX188). Dibutyltin dilaurate is available from Aldrich Corporation. The mixture was kept in a sealed vial at room temperature and periodically checked until the polyol solution began to harden. The encapsulated gel was taken out of the polyol/catalyst mixture, surface cleaned, weighed ($W_2$), and placed into a fresh mixture of an oligomeric product composed of the ester formed from adipic acid and 1,4 cyclohexane dimethanol and dibutyltin dilaurate (1 w %). The weight gain:

$$WG = (W_2 - W_1)/W_1 \times 100$$

was measured to be 10–15%. The encapsulated gels were allowed to remain in the polyol/catalyst mixture in a sealed vial at room temperature and periodically shaken for 7 days. No hardening of the liquid surrounding the gels was observed.

Example 2

A poly (N,N-dialkylacrylamide)-based gel swollen with an isocyanate containing trimeric hexamethylene diisocyanate (in isocyanurate form) was prepared as set forth above in steps 1.1 to 1.3. The swollen gels were surface cleaned, weighed ($W_1$), and briefly (for 2–3 seconds) placed into an excess of poly(propylene glycol)bis(2-aminopropyl ether) ("PPGBAE") having an average molecular weight of 230. PPGBAE is available from Aldrich Corporation. The gels were then removed and contacted with an isocyanate (HDTLV RHONE POULENC) for about 2–3 seconds. Formation of a polyurea layer around each particle was immediate. The gels were again contacted with PPGBAE and isocyanate and then the encapsulated gels were placed into a sealed vial at room temperature overnight in order to complete formation of the polyurea layer. The encapsulated gels were weighed ($W_2$) and placed into the mixture of an oligomeric product composed of the ester formed from adipic acid and 1,4 cyclohexane dimethanol and dibutyltin dilaurate (1 w %). The weight gain:

$$WG = (W_2 - W_1)/W_1 \times 100$$

was measured to be 50–70%. The encapsulated gels were placed in the polyol/catalyst mixture in a sealed vial at room temperature and periodically checked for 7 days. No hardening of the liquid surrounding the gel particles was observed.

Example 3

Non-encapsulated gels were swollen in isocyanate containing trimeric hexamethylene diisocyanate (in isocyanurate form) as described above in Example 1. These gels were then placed into a mixture of an oligomeric product composed of the ester formed from adipic acid and 1,4 cyclohexane dimethanol and dibutyltin dilaurate (1 w %) and kept in a sealed vial at room temperature and periodically shaken. Hardening of the polyol/catalyst mixture surrounding the gels was observed within about 3–4 hours.

An isocyanate containing trimeric hexamethylene diisocyanate (in isocyanurate form) was added dropwise into the mixture of an oligomeric product composed of the ester formed from adipic acid and 1,4 cyclohexane dimethanol and dibutyltin dilaurate (1 w %) and the solution was kept in a sealed vial at room temperature and periodically checked. Hardening of the entire solution was completed within 1–2 hours.

3.1 Tagging Procedure for Monitoring Isocyanate Release by UV/Visible Spectroscopy.

A 1 ml solution of 0.42 g/ml Phenol Red (Aldrich) in DMSO was mixed with 138 g of an isocyanate containing trimeric hexamethylene diisocyanate in isocyanurate form to give 3 mg/g solution. Phenol Red is hereinafter referred to as "dye". Control tests showed that DMSO is an excellent solvent for the dye.

Figure 3:
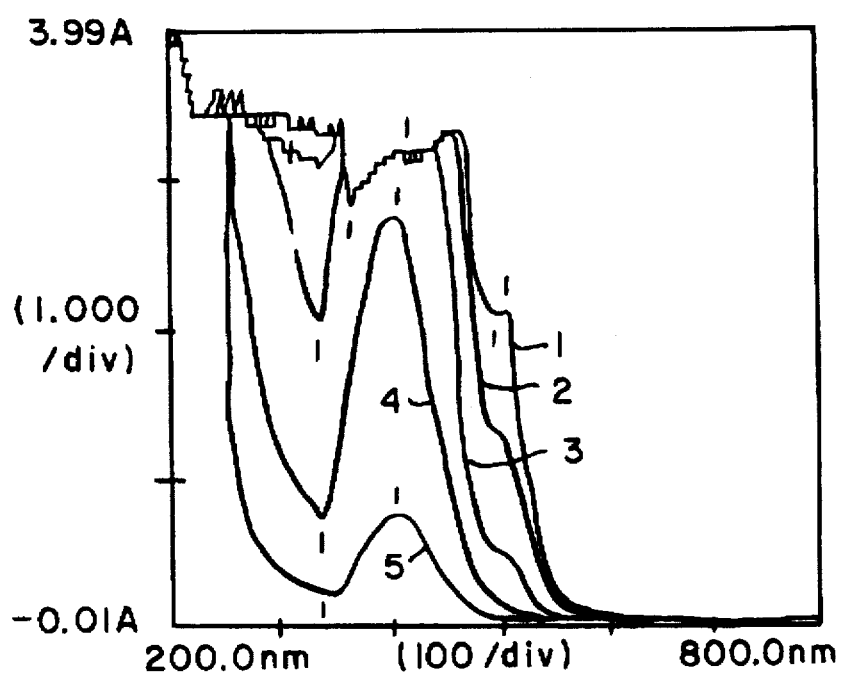
FIG. 3 is an absorbance spectrum of a solution of a phenol red dye in dimethylsulfoxide (DMSO)

The dye-in-isocyanate solution was shaken and kept at 70° C. for 3 days. The unreacted dye was allowed to settle, and the UV/visible spectra of colored isocyanates were recorded. (Shimadzu UV-16012, Quartz Cuvets, 1.0 cm path length). As shown in Table 1 and FIG. 2, the absorbance spectra of the tagged isocyanate revealed $\lambda_{max}$378 nm. $A_{378}$0.78. (see Table 1–$\lambda_{max}$=376 at Amax=0.78). In contrast, the absorbance spectra of the dye in DMSO without isocyanate added revealed $\lambda_{max}$406 nm, $A_{406}$0.79. (see Table 2 and FIG. 3). The observed 30 nm shift indicates significant perturbance of the electronic environment of the dye and suggests that the dye-isocyanate reaction took place.

TABLE 1

| Absorbance spectra of the tagged isocyanate (dilution by DMSO). | | | |
|---|---|---|---|
| No. | Dilution, times | $\lambda_{max}$, nm | $A_{max}$ |
| 1 | — | 398 | >3 |
| 2 | 2 | 401 | >3 |
| 3 | 5 | 378 | >2 |
| 4 | 15 | 376 | 0.78 |

TABLE 2

| Absorbance spectra of the Dye in DMSO. | | | |
|---|---|---|---|
| No. | Dye concentration mg/g | $\lambda_{max}$, nm | $A_{max}$ |
| 1 | 3 | 449 | >3 |
| 2 | 1 | 454 | >3 |
| 3 | 0.5 | 416 | >3 |

TABLE 2-continued

Absorbance spectra of the Dye in DMSO.

| No. | Dye concentration mg/g | $\lambda_{max}$, nm | $A_{max}$ |
|---|---|---|---|
| 4 | 0.2 | 410 | >2 |
| 5 | 0.03 | 406 | 0.79 |

3.2 Solvent-Triggered Release of the Tagged Isocyanate as Demonstrated by UV/Visible Spectroscopy Poly(dimethylacrylamide) gel (1.2 mol % crosslinking by methylenebis(acrylamide)) was allowed to swell in a tagged isocyanate solution containing trimeric hexamethylene diisocyanate (in isocyanurate form) for 2 days. The gel swollen in the tagged isocyanate was placed in an excess mixture of an oligomeric product composed of the ester formed from adipic acid and 1,4 cyclohexane dimethanol and dibutyltin dilaurate (catalyst, 1 w %). The mixture was kept in a sealed vial at room temperature and periodically checked until the polyol solution began to harden. The encapsulated gels were removed from the polyol/catalyst mixture, surface cleaned, and placed into a fresh mixture of an oligomeric product composed of the ester formed from adipic acid and 1,4 cyclohexane dimethanol and dibutyltin dilaurate (1 w %). The encapsulated gels were left in the polyol/catalyst mixture in a sealed vial at room temperature and periodically checked for 2 days. No hardening of the liquid surrounding the gels or release of yellow color into the polyol surrounding the gels was observed. This suggests that the encapsulation layer provided an effective barrier for the gels in the polyol solution.

Figure 4:
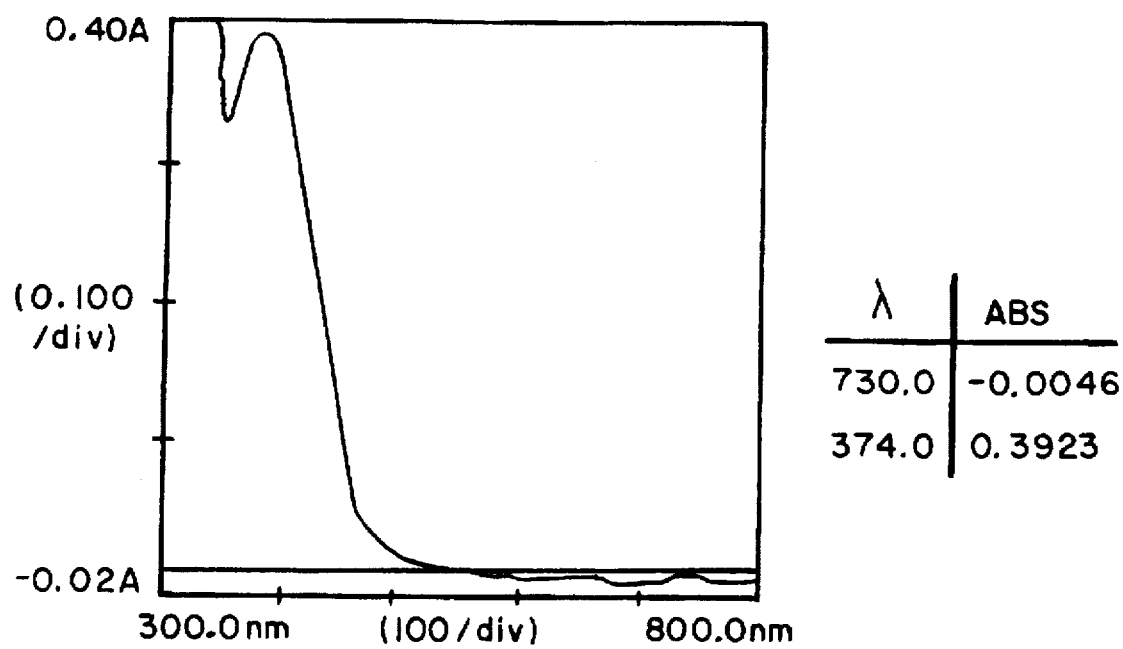
FIG. 4 is an absorbance spectrum of dye-tagged isocyanate molecules released after being encapsulated into a gel and then swollen with dried acetone according to the present invention.
Figure 5:
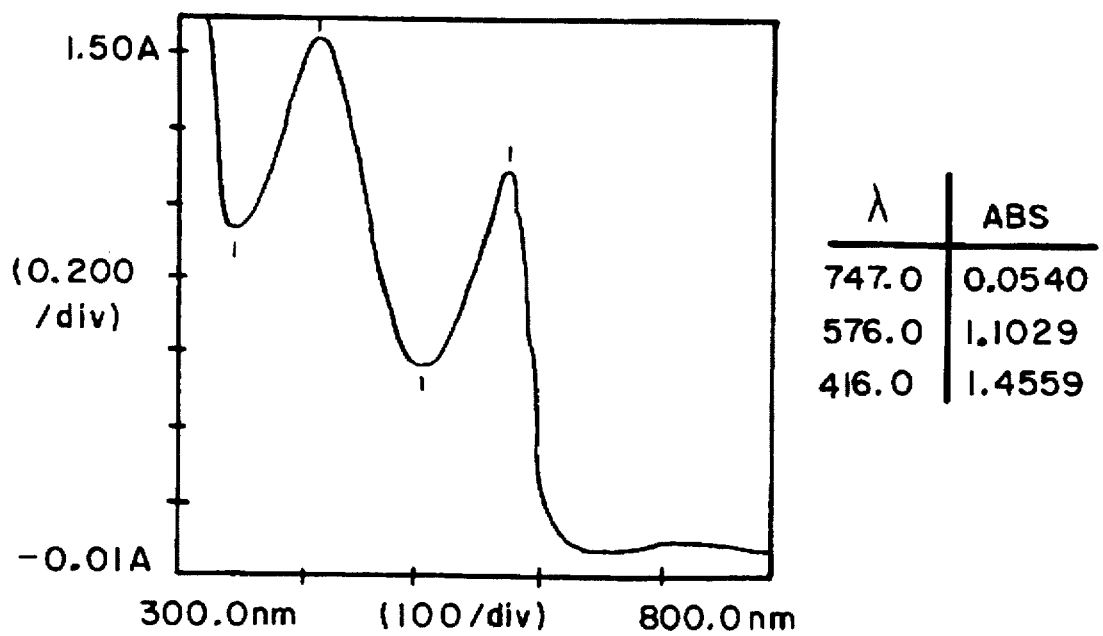
FIG. 5 is an absorbance spectrum of dye-tagged isocyanate molecules after being encapsulated into a gel and then swollen with dried acetone in which poly(propylene glycol) bis(2-aminopropyl ether) was added to the acetone fraction containing the released dye-tagged isocyanate molecules according to the present invention.

Several encapsulated gels were then taken out of the mixture and placed in excess dried acetone. Swelling of the gels, followed by the release of a yellow/orange colored compound within 2–3 hours was observed. As illustrated in FIG. 4, the released compound possessed maximum absorbance at 374 nm in the electronic spectrum, thereby indicating that the released compound was essentially the dye-tagged isocyanate (compare with the spectrum of the tagged isocyanate with $\lambda_{max}$, nm at 376 nm). Reactivity of the released species was confirmed by addition of poly (propylene glycol)bis(2-aminopropyl ether) (available from Aldrich Corporation as JEFFAMINE® D-230) into the acetone fraction which contained the released dye-colored isocyanate. Upon addition of JEFFAMINE® D-230, the solution turned violet and relevant peaks in the electronic spectrum were observed: $\lambda_{max}$, nm at 576 and 416 as shown in FIG. 5.

3.3 Solvent Triggered Release of the Gel-Encapsulated Isocyanate as Demonstrated by FTIR.

Poly (dimethylacrylamide) gel (1.2 mol % crosslinking by methylenebis(acrylamide)) was allowed to absorb tagged isocyanate containing trimeric hexamethylene diisocyanate (in isocyanurate form) for 15 days. Several of the gel particles swollen in the tagged isocyanate were placed into an excess mixture of an oligomeric product composed of the ester formed from adipic acid and 1,4 cyclohexane dimethanol and dibutyltin dilaurate (catalyst, 1 w %). The mixture was kept in a sealed vial at room temperature and periodically checked until the polyol solution began to harden.

Approximately 1.2 g of encapsulated gels were removed from the polyol/catalyst mixture, surface cleaned, and placed into the mixture of an oligomeric product composed of the ester formed from adipic acid and 1,4 cyclohexane dimethanol and dibutyltin dilaurate (1 wt %). The encapsulated gels remained in the polyol/catalyst mixture in a sealed vial at room temperature and were periodically checked for a day. Hardening of the liquid surrounding the gel particles was not observed, indicating that the encapsulation layer provided an effective barrier for the gel in the polyol solution.

Figure 6:
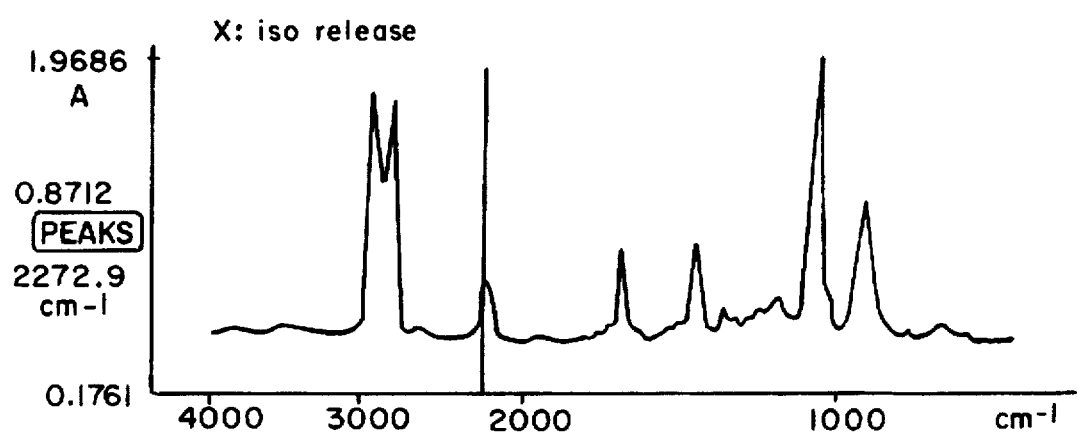
FIG. 6 is an infrared (FTIR) spectrum of dye-tagged isocyanate molecules after being encapsulated into a gel and then swollen with dried tetrahydrofuran (THF) in which acetone was added to the released dye-tagged particles in accordance with the present invention.

Several of the encapsulated gels were then taken out of the mixture and placed into 4 ml of anhydrous tetrahydrofuran (THF). Swelling of gels was observed within 3 days. The FTIR spectrum of the released compound in THF revealed the presence of intact isocyanate component as shown by peaks at approximately 2270 $cm^{-1}$ in FIG. 6.

3.4 Polyurethane Formation Through Shear Triggered Release

Poly(dimethylacrylamide) gel (1.2 mol % crosslinking by methylenebis(acrylamide)) was allowed to absorb colored isocyanate containing trimeric hexamethylene diisocyanate (in isocyanurate form) in methyl ethyl ketone (1:1 v/v) for 2 days. The methyl ethyl ketone then was removed from the gels by vacuum stripping such that colored isocyanate remained in the gels. The gels swollen in the colored isocyanate were placed into an excess mixture of an oligomeric product composed of the ester formed from adipic acid and 1,4 cyclohexane dimethanol and dibutyltin dilaurate (catalyst, 1 wt %). The mixture was kept in a sealed vial at room temperature and periodically agitated until the polyol solution began to harden. The encapsulated gels were removed from the polyol/catalyst mixture, surface cleaned, weighed, and placed into the mixture of an oligomeric product composed of the ester formed from adipic acid and 1,4 cyclohexane dimethanol and dibutyltin dilaurate (1 wt %). The encapsulated gels were allowed to stay in the polyol/catalyst mixture in a sealed vial at room temperature and periodically agitated for 24 hours. Hardening of the liquid surrounding the gel particles was not observed, indicating that the encapsulation layer had formed.

Several of the encapsulated gels were then taken out of the mixture and placed into a pipe with a needle valve on the downstream side. Upon application of air pressure ($\leq 45$ PSIG), gel particles were transported across the shear zone of the valve, to produce small gel pieces at the outlet. The broken gel particles quickly hardened at 60° C. which confirmed the reactivity of the isocyanate exposed to the gel surface.

Example 4

In this example, an isocyanate is swollen in a poly(ethyl acrylate)-based gel and encapsulated with polyol, followed by triggered release of fully nonaqueous reactive isocyanate.

4.1 Gel Synthesis

A mixture of 5.0 ml (46.1 mmol) ethyl acrylate (EtAc, monomer), and 50 µl of 0.0226 ml/ml solution of ethylene glycol dimethacrylate (EGDMA, 5.99 µmol, crosslinker) in dimethylsulfoxide (DMSO) was deaerated by $N_2$ bubbling for about 0.5 hours. Approximately 100 µl of freshly prepared solution of 100 mg/ml benzoyl peroxide in ethyl acrylate was added, and the resulting solution was stirred and maintained at 70° C. Polymerization was observed after approximately 2 hours, however, the solution with the forming polymer was allowed to stay at 70° C. overnight. The formation of a crosslinked polymeric gel network was completed within a day at 70° C.

4.2 Isocyanate Loading

A cube-shaped piece of the gel network produced above in Section 4.1 (98 g dry weight) was placed into an excess mixture of 1 g of trimeric hexamethylene diisocyanate (in the isocyanurate form) per 1 ml of THF. The gel was allowed to swell in the mixture for 5 days at room temperature. The weight of the swollen gel was measured to be 958 mg, or, a total uptake of 877%. The swollen gel was dried under high vacuum for 3 hours. The weight of the dried gel was measured to be 315 mg such that the isocyanate uptake was about 220%.

4.3 Gel Encapsulation

The gels swollen with isocyanate as in Section 4.2 were placed into a vial containing an excess of an oligomeric product composed of the ester formed from adipic acid and 1,4 cyclohexane dimethanol and dibutyltin dilaurate (1 w % in polyol) for 4 hours at room temperature. We observed signs of hardening of the liquid surrounding the gels. After encapsulation, we observed a transparent viscous polymeric film around each gel. Encapsulated gels were removed from the polyol/catalyst mixture and placed into a separate vial containing a fresh polyol/catalyst mixture. No signs of hardening of the polyol/catalyst mixture contacting the encapsulated gels were observed over a period of one month and longer, thereby evidencing encapsulation efficiency.

4.4 Test of Active Isocyanate Released from Encapsulated Gel

Encapsulated gels (see Section 4.3) were weighed and placed into dry THF in such a way that the gels constituted a suspension of 40 mg of gel per 1 ml of THF. The gels in the THF were constantly agitated for about 3 hours. The gels exhibited significant swelling.

Figure 7A:
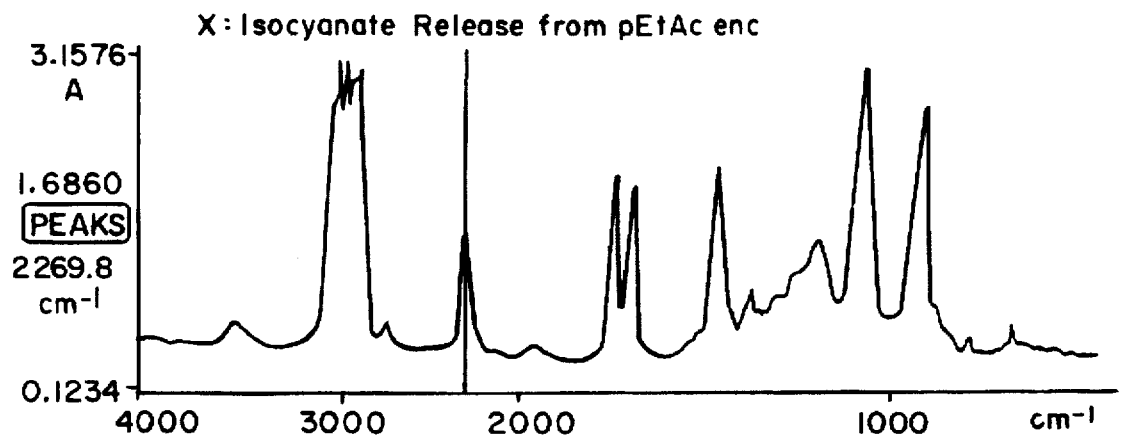
FIGS. 7(a) and 7(b) are infrared (FTIR) spectra of the isocyanurate form of trimeric hexamethylene diisocyanate molecules released from a polyurethane-coated poly(ethyl acrylate) gel in the presence of tetrahydrofuran (THF) according to the present invention.
Figure 7B:
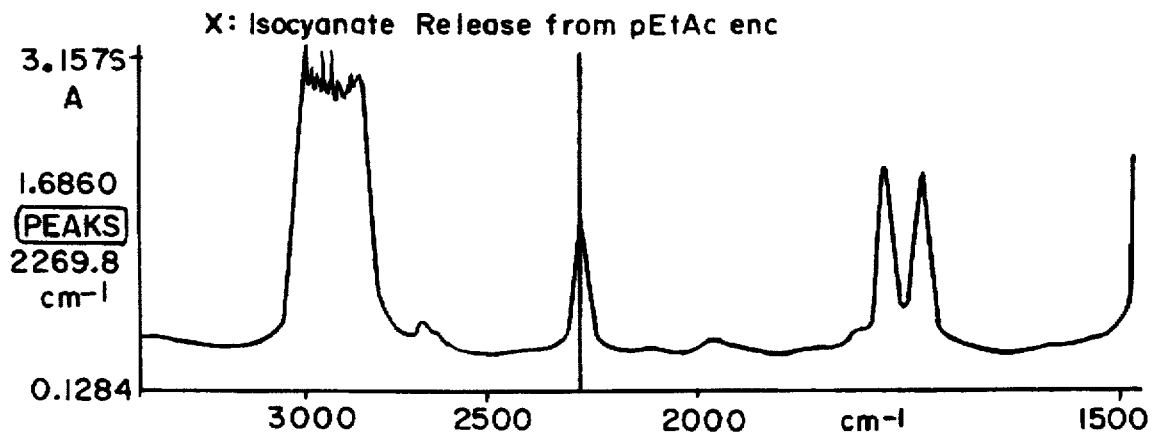

THF solutions surrounding the gels were analyzed by means of FTIR on a Perkin-Elmer Model 1620 spectrometer applying AgBr crystals. As shown in FIG. 7, we observed a peak at 2270 cm$^{-1}$ (—N=C=O vibrations), which is very strong evidence of unreacted isocyanate present in the solution.

ENCAPSULATION OF MULTIFUNCTIONAL AMINES INTO GELS FOLLOWED BY TRIGGERED RELEASE OF AMINES

Reactions between di- or triamines and multifunctional (typically, di- or trifunctional) epoxy compounds represent the type of nonaqueous reactive chemistry widely used in the coating industry, for plastic encapsulants, and the like.

Example 5

5.1 Gel Swelling and Encapsulation

In this example, poly(propylene glycol)bis(2-aminopropyl ether) having the following formula:

$$CH_3CH(NH_2)CH_2[OCH_2CH(CH_3)]_nNH_2, \quad (1)$$

was utilized to illustrate encapsulation of a diamine. N,N'Dimethylacrylamide (DMAAm),-based gels and N-isopropylacrylamide (NIPA)-based gels were prepared using conventional methods with various crosslinkers such as: methylenebis(acrylamide) (bis), magnesium methacrylate (MgMA$_2$), and di(ethylene glycol)bis(allyl carbonate) (DEGBAC). DMAAm-based gels were synthesized in DMSO, washed with acetone and collapsed with toluene. NIPA-based gels were synthesized in water and then dried. Examples of swelling of different gels for 2 days in compound (1) are shown in Table 3. Diamine uptake was estimated using the formula:

Uptake, $\% = (W_s - W_d)/W_d \times 100$, where $W_s$, mg is the weight of the swollen gel, and $W_d$, mg is the weight of dry polymer obtained by extracting the diamine from the gel by excess acetone followed by drying the gel at 70° C. for about 12 hours.

TABLE 3

Diamine Uptake by Gels

| Sample | Weight dry, mg | Weight swollen, mg | Uptake % |
|---|---|---|---|
| DMAAm gel crosslinked by DEGBAC | 4.3 | 140 | 3160 |
| | 5.6 | 166 | 2860 |
| | 5.1 | 170 | 3230 |
| DMAAm gel crosslinked by MgMA$_2$ | 4.4 | 198 | 4400 |
| DMAAm gel crosslinked by bis | 5.0 | 107 | 2040 |
| | 6.6 | 158 | 2290 |
| NIPA gel crosslinked by bis | 12 | 143 | 1090 |

Gel particles swollen in the diamine were placed into trimeric hexamethylene diisocyanate for 10–15 seconds and then quickly removed and placed into a fresh aliquot of diamine where a whitish viscous polyurea layer formed immediately around each of the gel particles. Depending on the thickness of the polyurea layer desired, the process of placing particles into isocyanate and diamine may be repeated to thicken the polyurea layer around the particles. The encapsulated gels were removed from the liquid and kept in air overnight where the encapsulating polyurea layer hardened. Examples of encapsulation of various gel systems resulting in a weight gain by gels are shown in Table 4.

TABLE 4

Weight Gain of Gels Resulting from Encapsulation

| Sample | Weight, swollen in diamine, mg | Weight, swollen and then encapsulated, mg | Weight gain, % |
|---|---|---|---|
| DMAAm gel crosslinked by DEGBAC | 125 | 230 | 83 |
| DMAAm gel crosslinked by bis | 105 | 167 | 59 |
| NIPA gel crosslinked by bis | 66 | 117 | 77 |

5.2 Encapsulation Test

The encapsulated gels formed in Section 5.1 were then tested to determine whether the encapsulation procedure effectively prevented release of dime into nonaqueous reactive mixtures. Encapsulated gels were introduced into an epoxy solution, N,N-diglycidyl- 4-glycidyloxyaniline, at 20° C. N,N-diglycidyl-4-glycidyloxyaniline is available commercially from Aldrich Corporation. We observed hardening of the resulting mixture within 1–2 hours. In the control experiments without any gel, the diamine and epoxy compound were quickly mixed and complete hardening of the mixture was observed within 20–30 minutes.

5.3 Test of Solvent-Triggered Release of Diamine from Encapsulated Gels

The following test was conducted in order to ensure proper release of the diamine encapsulated in the gels prepared according to Section 5.1, and to establish the capability of the diamine to polymerize upon swelling and be released from the gel upon contact with acetone. Acetone is a swelling agent for DMAAm. Encapsulated gels were kept in anhydrous acetone for 2 days at 20° C. The gel systems utilized for this test are shown in Table 5.

TABLE 5

Gel Systems Used in Testing of Solvent-Triggered Release of the Diamine

| ID No. | Sample | Weight of encapsulated gel, mg | Volume of dry acetone added, ml |
|---|---|---|---|
| 1 | DMAAm gel crosslinked by DEGBAC | 126 | 3 |
| 2 | DMAAm gel crosslinked by bis | 98 | 3 |
| 3 | NIPA gel crosslinked by bis | 164 | 3 |

Following disruption of the encapsulation layer by swelling in acetone for 2 days, 1 ml of the solution surrounding the gels was withdrawn and placed into 2 ml of an epoxy compound (as in 5.2) at 20° C. Complete hardening of the mixture was observed overnight. In the control experiments without any gel, 1 ml of dry acetone was placed into 2 ml of epoxy compound at 20° C. No complete hardening of the mixture was observed overnight.

ENCAPSULATION OF CATALYSTS INTO GELS FOLLOWED BY TRIGGERED RELEASE OF CATALYSTS

Example 6

In this example, a catalyst was encapsulated in a gel and then, the catalyst was released into a reactive medium in order to induce a polymerization reaction.

6.1 Gel Swelling and Encapsulation

Dibutyltin dilaurate having the following formula:

$$[CH_3(CH_2)_{10}CO_2]_2Sn[(CH_2)_3CH_3]_2 \quad (2)$$

is widely used as a catalyst for elastomeric processing by reaction injection molding for automobile fascia, bumpers, body panels and the like. Dimethylacrylamide (DMAAm)-based and N-isopropylacrylamide (NIPA)-based gels were prepared using various crosslinkers, including methylenebis (acrylamide) (bis), magnesium methacrylate (MgMA$_2$), and di(ethylene glycol)bis(allyl carbonate) (DEGBAC). DMAAm-based gels were synthesized in DMSO, washed with acetone and collapsed by toluene. NIPA gels were synthesized in water and then dried. A cellular material consisting of polyurethane foam, was also tested to determine catalyst uptake. Examples of swelling for 3 days of different gels and foam are illustrated in Table 6. Catalyst uptake was estimated using the formula

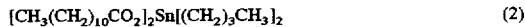

Uptake, $\% = (W_s - W_d)/W_d \times 100$, where $W_s$ (mg), is the weight of the swollen gel, and $W_d$ (mg), is the weight of dry polymer obtained by extracting the catalyst from the gel using excess acetone followed by drying the gel at 70° C. for about 12 hours.

TABLE 6

Catalyst Uptake by Gels and a Foam

| Sample | Weight dry, mg | Weight swollen, mg | Uptake, % |
|---|---|---|---|
| DMAAm gel crosslinked by DEGBAC | 7.9 | 32 | 310 |
|  | 7.8 | 28 | 250 |
|  | 46 | 180 | 290 |
| DMAAm gel crosslinked | 13 | 39 | 200 |

TABLE 6-continued

Catalyst Uptake by Gels and a Foam

| Sample | Weight dry, mg | Weight swollen, mg | Uptake, % |
|---|---|---|---|
| by MgMA$_2$ | 6.2 | 22 | 250 |
| DMAAm gel crosslinked | 50 | 150 | 190 |
| by bis | 42 | 130 | 210 |
| NIPA gel crosslinked | 14 | 35 | 150 |
| by bis | 7.5 | 23 | 210 |
| Polyurethane foam | 17 | 110 | 550 |
|  | 21 | 150 | 610 |

Either the gel or the foam swollen in the catalyst were then placed into trimeric hexamethylene diisocyanate for 10–15 seconds and then quickly taken out and placed into poly(propylene glycol)bis(2-aminopropyl ether) having the formula:

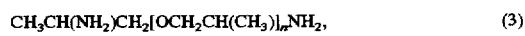

$$CH_3CH(NH_2)CH_2[OCH_2CH(CH_3)]_nNH_2, \quad (3)$$

where a whitish viscous polyurea layer formed immediately around the gel or foam particles. Depending on the thickness of the polyurea layer desired, the process of placing particles into isocyanate and diamine may be repeated to thicken the polyurea layer. The encapsulated materials were removed from the liquid and kept in air overnight where the encapsulating polyurea layer hardened. Weight gain by the gels are shown in Table 7.

TABLE 7

Weight Gain of Gels Resulting From Encapsulation

| Sample | Weight, swollen in catalyst, mg | Weight, swollen and then encapsulated, mg | Weight gain, % |
|---|---|---|---|
| DMAAm gel crosslinked by DEGBAC | 260 | 450 | 73 |
| DMAAm gel crosslinked by bis | 140 | 230 | 64 |
| NIPA gel crosslinked by bis | 110 | 160 | 45 |

6.2 Encapsulation Test

In order to determine whether the encapsulation procedure described in Section 6.1 effectively prevented the release of catalyst into reactive mixtures, the following test was conducted. Encapsulated gels containing catalyst were added into an oligomeric product composed of the ester formed from adipic acid and 1,4 cyclohexane dimethanol. Then, an isocyanate containing trimeric hexamethylene diisocyanate (in isocyanurate form) was quickly added. The resulting mixtures originally at about 20° C. were immediately placed into 60° C. oven where hardening of the liquid surrounding the encapsulated gels was monitored. The results of the encapsulation test are shown in Table 8. "+" represents complete hardening which manifests polymerization of isocyanate/polyol mixture within 5.0 min at 60° C., and "−" represents the absence of observed changes in the polyol/isocyanate mixture under identical conditions.

TABLE 8

Results of Encapsulation Test

| Sample | Weight of encapsulated gel, mg | Weight of polyol, g | Weight of isocyanate, g | Result |
|---|---|---|---|---|
| DMAAm gel cross-linked by DEGBAC | 180 | 2.8 | 1.9 | − |
| DMAAm gel cross-linked by bis | 230 | 3.1 | 2.5 | − |
| NIPA gel crosslinked by bis | 160 | 3.6 | 3.9 | − |
| Control 1 | — | 4.4 | 2.8 | − |
| Control 2 | — | 3.8 40 mg catalyst added | 2.6 | + |

6.3 Test of Solvent-Triggered Release of Catalyst from Encapsulated Gel

This experiment demonstrated that the release of the catalyst encapsulated in the gels prepared according to Section 6.1 would be capable of inducing polymerization upon solvent (acetone) triggered release of the catalyst. Encapsulated gels were kept in dry acetone for 18 hours at 20° C. The gel systems used for this test are given in Table 9.

TABLE 9

Gel Systems Used in Testing of Solvent-Triggered Release of the Catalyst

| ID No. | Sample | Weight of encapsulated gel, mg | Volume of dry acetone added, ml |
|---|---|---|---|
| 1 | DMAAm gel crosslinked by DEGBAC | 281 | 2 |
| 2 | DMAAm gel crosslinked by bis | 135 | 2 |
| 3 | NIPA gel crosslinked by bis | 521 | 4 |

Following swelling of the gels in acetone for 18 hours, 1 ml of the solution surrounding the gels was withdrawn and placed into an oligomeric product composed of the ester formed from adipic acid and 1,4 cyclohexane dimethanol. An isocyanate was then added as shown in Table 10. The resulting mixtures were quickly stirred and immediately placed into an oven at 60° C. where hardening of the liquid surrounding the encapsulated gels was monitored. The results of the release test are shown in Table 10. "+" represents complete hardening which manifests polymerization of isocyanate/polyol/acetone mixture within 5.0 min at 60° C. "−" represents the absence of the viscosity increase in the polyol/isocyanate/acetone mixture under identical conditions.

TABLE 10

Results of Testing of Solvent-Triggered Release of the Catalyst from Encapsulated Gels

| Acetone component | Weight of polyol, g | Weight of isocyanate, g | Result |
|---|---|---|---|
| ID No. 1 (Table 4), 1 ml | 1.3 | 2.4 | + |
| ID No. 2 (Table 4), 1 ml | 2.1 | 1.9 | + |
| ID No. 3 (Table 4), 1 ml | 2.2 | 2.4 | + |
| Dry acetone, 1 ml, 20 mg catalyst added (Control 1) | 1.9 | 1.7 | + |
| Dry acetone, 1 ml, (Control 2) | 1.9 | 2.5 | − |

6.4 Shear-Triggered Catalyst Release from Encapsulated Gel

Encapsulated gels particles were sheared into smaller particles and immediately placed into an oligomeric product composed of the ester formed from adipic acid and 1,4 cyclohexane dimethanol. Isocyanate was then added. The resulting mixtures were quickly stirred and immediately placed into an oven at 60° C. where hardening of the liquid surrounding the encapsulated gels was monitored. The results of the release test are illustrated in Table 11. "+" represents complete hardening which manifests polymerization of isocyanate/polyol mixture within 5.0 min at 60° C. "−" represents the absence of the viscosity increase in the polyol/isocyanate mixture under identical conditions (1:1 w/w) mixture at 60° C.

TABLE 11

Shear-Triggered Release of Catalyst From Encapsulated Gels

| Sample | Weight of encapsulated gel, mg | Weight of polyol, g | Weight of isocyanate g | Result |
|---|---|---|---|---|
| DMAAm/DEGBAC gel mechanically sectioned | 180 | 3.5 | 2.2 | + |
| DMAAm/bis gel mechanically sectioned | 250 | 4.3 | 2.6 | + |
| NIPA/bis gel mechanically sectioned | 220 | 2.7 | 1.8 | + |
| Intact DMAAm/ DEGBAC gel (Control) | 330 | 1.9 | 2.2 | − |

GELS CAPABLE OF SWELLING IN HIGHLY REACTIVE ORGANIC COMPOUNDS

Example 7

A mixture of 10 mL (97 mmol) dimethylacrylamide (DMAAm, monomer) and a specified amount of ethylene glycol dimethacrylate (EGDMA, crosslinker) was deaerated by $N_2$ bubbling for 0.5 hours. Then; 100 µl of freshly prepared 80 mg/ml solution of 2,2'.-azobis (2-methylpropionitrile) (initiator) in DMAAm was added. The solution was stirred and placed into a bath at 70° C. Polymerization with liberating heat was observed within 1–2 hours. Polymer gel samples were slowly cooled down to room temperature and kept in sealed vials. Data on swelling of polymer gel samples having various degrees of crosslinking are illustrated in Tables 12 and 13. Swelling experiments were run for 2 days at room temperature.

TABLE 12

Swelling of Poly(dimethylacrylamide) in 1,6-Diisocyanatohexane (HMDI).

| Polymer fraction No. | EGDMA/DMAAm molar ratio | Weight dry, mg | Weight swollen, mg | Uptake, % |
|---|---|---|---|---|
| 1 | No crosslinker | 93 | dissolution | |
| 2 | 1:2000 | 101 | 790 | 680 |
| 3 | 1:1000 | 150 | 1290 | 760 |
| 4 | 1:667 | 69 | 560 | 710 |
| 5 | 1:500 | 46 | 360 | 680 |

TABLE 13

Swelling of Poly(dimethylacrylamide) in Poly(propylene glycol)-bis(2-aminopropyl ether) (PPGBAE, JEFFAMINE ® D-230).

| Polymer Gel fraction No. | EGDMA/DMAAm molar ratio | Weight dry, mg | Weight swollen, mg | Uptake, % |
|---|---|---|---|---|
| 1 | No crosslinker | 38 | dissolution | |
| 2 | 1:2000 | 130 | 290 | 120 |
| 3 | 1:1000 | 85 | 230 | 170 |
| 4 | 1:667 | 81 | 190 | 140 |
| 5 | 1:500 | 99 | 290 | 190 |

Example 8

A mixture of 10 mL (97 mmol) dimethylacrylamide (DMAAm, monomer) and 30 μL (146 μmol) ethylene glycol dimethacrylate (EGDMA,crosslinker) was deaerated by $N_2$ bubbling for 0.5 hours. Then, 50 μL of freshly prepared 300 mg/ml solution of ammonium persulfate (initiator) and 10 v/v % N,N,N',N',-tetramethylethylenediamine (promoter) in dried dimethylsulfoxide were added. The solution was stirred and placed into a refrigerator at 3° C. Polymerization was observed overnight. Data on swelling of the resulting polymer gels are shown in Table 14. Swelling experiments were conducted for 2 days at room temperature.

TABLE 14

Swelling of Poly(dimethylacrylamide) in Poly(propylene glycol)bis(2-aminopropyl ether) (PPGBAE), 1,6-Diisocyanatohexane (HMDI), and Dibutyltin dilaurate (DBTDL).

| Swelling agent | Weight dry, mg | Weight swollen, mg | Uptake, % |
|---|---|---|---|
| HMDI | 107 | 730 | 580 |
| PPGBAE | 180 | 460 | 160 |
| DBTDL | 120 | 140 | 17 |

Example 9

A mixture of 5 mL (35 mmol) diethylacrylamide (DEAAm, monomer) and 15 μL (73 μmol) ethylene glycol dimethacrylate (EGDMA,crosslinker) was deaerated by $N_2$ bubbling for 0.5 hours. Then, 30 μl of freshly prepared 300 mg/ml solution of ammonium persulfate (initiator) and 10 v/v % N,N,N',N',-tetramethylethylenediamine (promoter) in dried dimethylsulfoxide were added. The solution was stirred and placed into a refrigerator at 3° C. Polymerization was observed overnight. Data on swelling of the resulting polymer gel samples are illustrated in Table 15. Swelling experiments were conducted for 2 days at room temperature.

TABLE 15

Swelling of Poly(dimethylacrylamide) in Poly(propylene glycol)bis(2-aminopropyl ether) (PPGBAE), 1,6-Diisocyanatohexane (HMDI), and Dibutyltin dilaurate (DBTDL).

| Swelling agent | Weight dry, mg | Weight swollen, mg | Uptake, % |
|---|---|---|---|
| HMDI | 99 | 880 | 790 |
| PPGBAE | 46 | 280 | 510 |
| DBTDL | 100 | 240 | 140 |

Example 10

Dimethylacrylamide (DMAAm: monomer) of a volume of 10 mL (97 mmol) was deaerated by $N_2$ bubbling for 0.5 hour. Then, 0.3 mL of ethylene glycol dimethacrylate (EGDMA,crosslinker) saturated by benzoyl peroxide was added. The mixture was stirred quickly and following addition of 15 μL of N,N,N'N'-tetramethylethylenediamine (promoter) was added, and the solution was kept a 3° C. Gelation was observed within 10–15 minutes. Polymerization was allowed to continue overnight at room temperature.

A transparent, homogeneous gel was formed and easily crashed into small pieces by stirring. Microscopic investigation showed the presence of small particles of irregular shape (i.e. effective size 20 microns and smaller). The data on the swelling of the gels are reported in Table 16.

TABLE 16

Swelling of Poly DMAAm/EGDMA Gel for 2 days in Adipoyl Chloride (ACI) and 1,6-Diisocyanatohexane (HMDI), at 20° C.

| Swelling agent | Weight dry, mg | Weight swollen, mg | Uptake, % |
|---|---|---|---|
| ACI | 32 | 83 | 160 |
| HMDI | 42 | 160 | 280 |

Example 11

A mixture of 5.0 ml (46.1 mmol) ethyl acrylate (EtAc, monomer) and 50 μl of 0.0226 ml/ml solution of ethylene glycol dimethacrylate (EGDMA, 5.99 μmol; crosslinker) in dimethylsulfoxide was deaerated by $N_2$ bubbling for 0.5 hours. Then, 100 μl of freshly prepared solution of 100 mg/ml benzoyl peroxide in ethyl acrylate was added. The solution was stirred and allowed to stay at 70° C. overnight until formation of a soft polymeric gel network was completed. Data on swelling of the gel in PI, HDMI and PPGBAE are illustrated in Table 17.

TABLE 17

Swelling of PolyEtAc/EGDMA Gel for 2 days in Phenyl Isocyanate (PI), 1,6-Diisocyanatohexane (HMDI), Poly(propylene glycol)bis(2-aminopropyl ether) (PPGBAE) at 20° C.

| Swelling agent | Weight dry, mg | Weight swollen, mg | Uptake, % |
|---|---|---|---|
| PI | 140 | 2700 | 1830 |
| HMDI | 74 | 1010 | 1260 |
| PPGBAE | 134 | 1240 | 825 |

Example 12

Two polymers were tested for swelling behavior in isocyanate. The first was polystyrene which was obtained commercially from Aldrich. Polystyrene did not swell in isocyanate. The second polymer was styrene-vinyl pyridine copolymer gel. The gel was prepared as follows: 1.07 ml 4-vinyl pyridine, 440 μl styrene, 86 μl divinyl benzene and 4 mg AIBN were mixed in 10ml DMF. The solution was degassed by running through nitrogen for about 10 minutes. The pre-gel solution was put at 70° C. for overnight to obtain strong clear gel with light yellow color. A piece of this copolymer gel was put in toluene, the gel collapsed and became completely opaque. Then the gel piece was put in isocyanate, and the gel swelled and became clear. This process was reversed within short period of time, i.e., a clear swollen gel in isocyanate was collapsed in toluene and became opaque, the same piece of gel was put back in isocyanate and it swelled and became clear again. After one day, the gel swollen in isocyanate hardened (and still remained clear). Presumably, the pyridine groups catalyzed a polymerization reaction of isocyanate.

ENCAPSULATION OF REACTIVE CHEMICALS INTO LYOGELS

In Examples 13–15, encapsulated lyogels are swollen with nonaqueous reactive chemicals which are capable of holding the reactive chemicals intact upon prolonged contact with aqueous solutions. This is presumed to be due to the hydrophobic properties of the encapsulating layer.

Example 13

13.1 Gel Synthesis

A mixture of 3.05 g (24 mmol) diethylacrylamide (DEAAm, monomer) and 55 µL (0.29 mmol) ethylene glycol dimethacrylate (EGDMA, crosslinker) was de, aerated by $N_2$ bubbling for 0.5 hours. Then, 20 µL of freshly prepared saturated solution of ammonium persulfate (initiator) in dried dimethylsulfoxide and 10 µL N,N,N',N',-tetramethylethylenediamine (promoter) were added. The solution was stirred and allowed to stay at room temperature overnight producing a transparent polymeric network. Then, the solution was heated to 70° C. where polymerization was completed within 2 hours.

13.2 Isocyanate Loading

A cube-shaped piece of polyDEAAm gel (dry weight 258 mg) was contacted with an excess mixture of 0.2 g of trimeric hexamethylene diisocyanate in the isocyanurate form per 1 ml of THF. The gel was allowed to swell in the mixture for about 3 hours at room temperature under constant agitation. The weight of the swollen gel was measured to be 707 mg, resulting in a total uptake of 174%. The swollen gel was vacuum dried for 3 hours. The weight of the dried gel was measured to be 348 mg, resulting in an isocyanate loading of 35%.

13.3 Gel Encapsulation

Poly $DEAA_m$ gel swollen with isocyanate was sectioned into pieces in order to ensure identical properties of the resulting Fraction 1 and Fraction 2. Each fraction was placed into a separate vial containing an excess of an oligomeric product composed of the ester formed from adipic acid and 1,4 cyclohexane dimethanol and dibutyltin dilaurate (1 wt % in polyol) for about 14 hours at room temperature. The liquid surrounding the gels hardened, indicating encapsulation of both fractions. After encapsulation, a transparent viscous polymeric film was visually observable around each gel.

Each fraction was removed from the polyol/catalyst mixture and placed into a separate vial. Fraction 1 remained intact and Fraction 2 was further sectioned into smaller pieces. The transparent encapsulating layer around Fraction 2 pieces was completely destroyed.

13.4 Demonstration of Successful Encapsulation in Water

An excess of deionized water (pH 5.3) was put into a series of vials: one vial contained encapsulated Poly $DEAA_m$ (Fraction 1) and another contained non-encapsulated poly $DEAA_m$ gel (Fraction 2). A white polyurea layer formation was observed within 15–20 minutes around the Fraction 1 particle, leaving the bulk of the encapsulated gel particle transparent. Small pieces of the non-encapsulated sectioned gel (Fraction 2) became completely white and no transparent areas were observed. The results indicate that the encapsulation shell prevents a substantial part of the isocyanate loaded into the gel from reacting with water. This may be attributed to the hydrophobicity of the polyol component of the polyurethane layer formed around the gel during encapsulation.

Both Fractions were allowed to stay in water for 1 hour at room temperature without agitation. The gels were then carefully removed from the water, surface cleaned free of liquid, and dried under vacuum for 1 hour.

13.5 Test of Isocyanate Release from Gel

The dried gels were weighed out and placed into dry THE in such a way that either Fraction 1 (the encapsulated gel) or Fraction 2 (the non-encapsulated gel) constituted a suspension of 40 mg of gel per 1 ml of THF. This was done to compare the weight of released isocyanate per weight gel. Both fractions were allowed to stay in THF for 1 hour under constant agitation.

Fraction 1 exhibited significant swelling and the white parts produced in 13.4 above were apparently dissolved in THF. Fraction 2 demonstrated some swelling but the white polyurea layers were not removed.

Figure 8A:
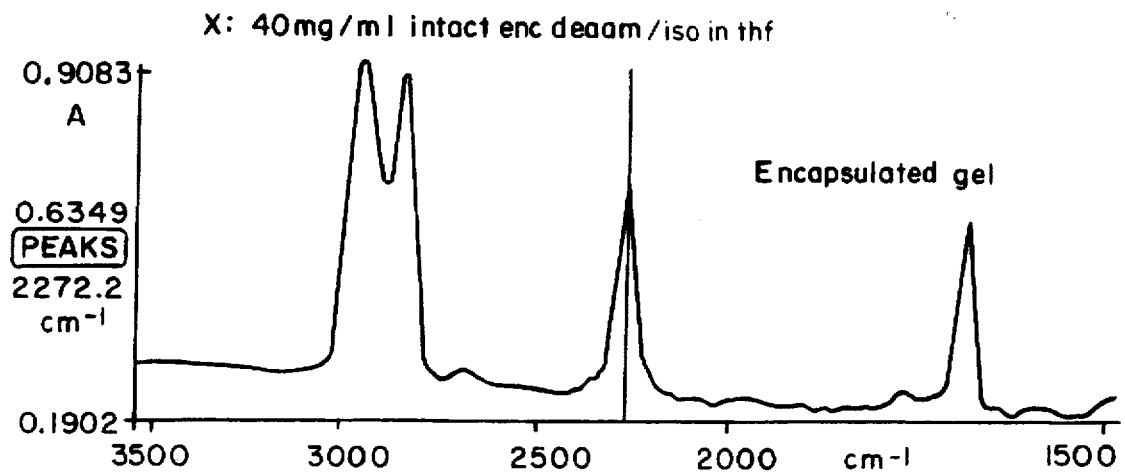
FIGS. 8(a) and 8(b) respectively illustrate infrared (FTIR) spectra for the encapsulated and non-encapsulated the isocyanurate form of trimeric hexamethylene diisocyanate molecules in polyurethane-coated poly(diethylacrylamide) gels in a solution of tetrahydrofuran (THF)
Figure 8B:
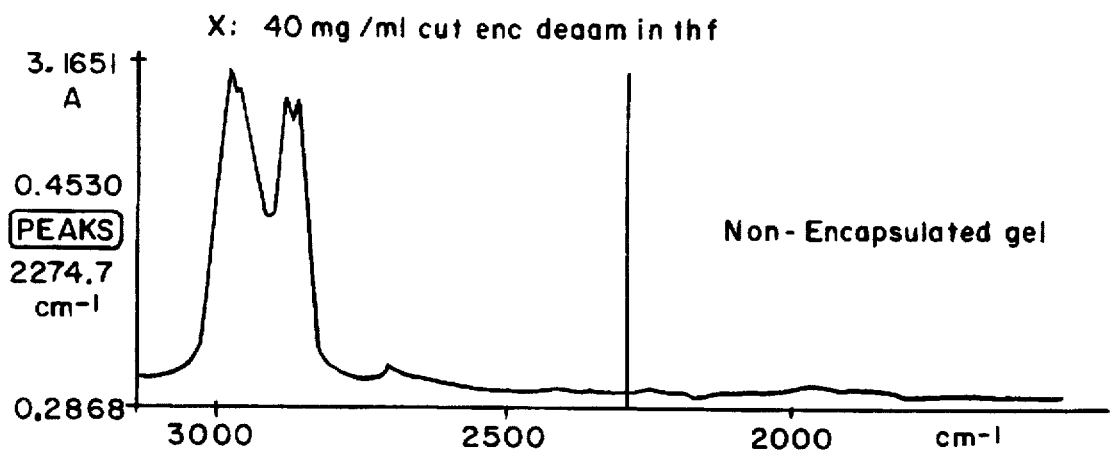

THF solutions surrounding the gels were then analyzed by means of FTIR on a Perkin-Elmer Model 1620 spectrometer applying AgBr crystals. A peak at 2270 $cm^{-1}$ (—N=C=O vibrations) strongly suggests the presence of unreacted isocyanate in the solution. As shown in FIG. 8, only the solution that was in contact with the encapsulated gel contained any isocyanate. No isocyanate was detected in the solution that had contacted the non-encapsulated gel. We conclude that a significant fraction of isocyanate was loaded into the gel and then once encapsulated, was prevented from contacting the ambient water.

Example 14

14.1 Gel Synthesis and Swelling

A mixture of 5 mL (48 mmol) dimethylacrylamide (DMAAm, monomer) and 218 µL (1.16 mmol) ethylene glycol dimethacrylate (EGDMA, crosslinker) was deaerated by $N_2$ bubbling for 0.5 hour. Then, 20 µl of freshly prepared saturated solution of ammonium persulfate (initiator) in dried dimethylsulfoxide and 10 µl N,N,N',N'-tetramethylethylenediamine (promoter) were added. The solution was stirred and held at 3° C. Polymerization was observed overnight, resulting in a strong transparent network.

PolyDMAAm gel (dry weight 630 mg) was allowed to swell in phenyl isocyanate for 4 days in a sealed vial at room temperature. The isocyanate uptake (i.e., weight of isocyanate per weight of dry polymer) was measured to be 1350%.

14.2 Gel Encapsulation

The gel produced in 14.1 was split into Fractions 1 and 2 and encapsulated as described in Example 13. Fraction 1 was left intact; Fraction 2 was sheared into small pieces as described in Example 13.

14.3 Demonstration of Successful Encapsulation in Water

Fractions 1 and 2 were placed in an excess of deionized water for 1 hour as described above in Example 13.4. A slightly yellowish polyurea layer was formed almost instantaneously around Fraction 1, leaving the bulk of the encapsulated gel transparent. Small sections of the non-encapsulated gel (Fraction 2) became completely covered with the yellowish white layer and we observed no transparent areas. This indicates that the encapsulation shell formed in 14.2 prevents a substantial part of the phenyl isocyanate that was loaded into the gel from reacting with water.

The gels were then carefully removed from the water, surface cleaned to remove excess liquid, and dried under vacuum for 1 hour.

14.4 Test of Isocyanate Release from Gel

Dried gels produced in 14.3 were weighed out and placed into dry THF in such a way that either (the encapsulated gel) Fraction 1 or (the non-encapsulated gel) Fraction 2 constituted a suspension of 36 mg of gel per 1 ml of THF. This was done to compare the weight of released isocyanate per weight gel. Both Fractions were allowed to stay in the THF for 1 hour under constant agitation. Fraction 1 exhibited significant swelling; the white parts produced in 14.3 were apparently dissolved in THF. Fraction 2 demonstrated some swelling but the white polyurea layers were not removed.

Figure 9A:
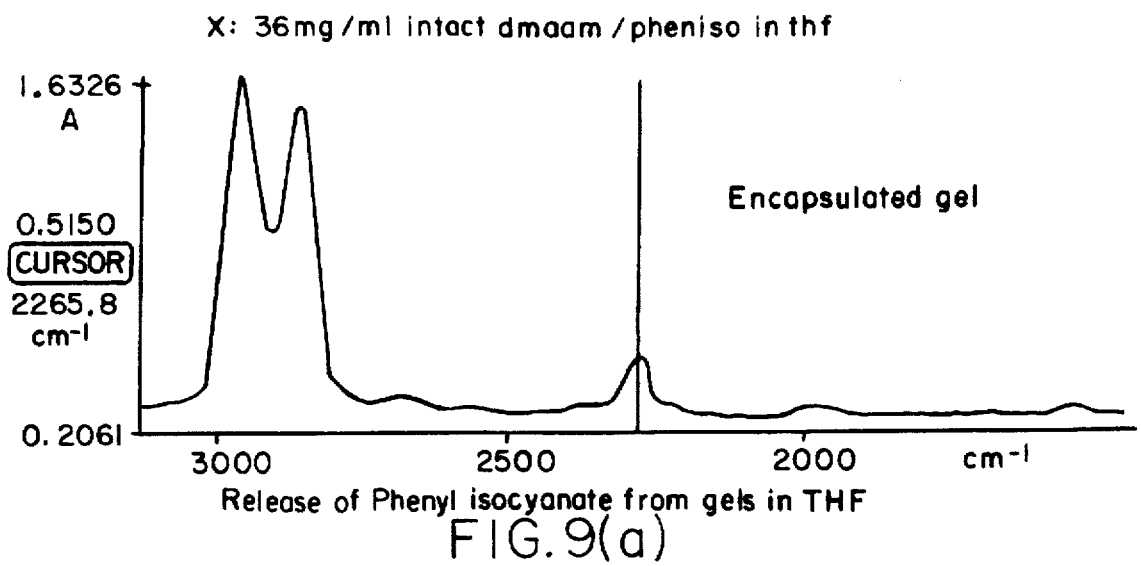
FIGS. 9(a) and 9(b) respectively illustrate infrared (FTIR) spectra for encapsulated and non-encapsulated phenyl isocyanate molecules in polyurethane-coated poly (dimethylacrylamide) gels in a solution of tetrahydrofuran (THF)
Figure 9B:
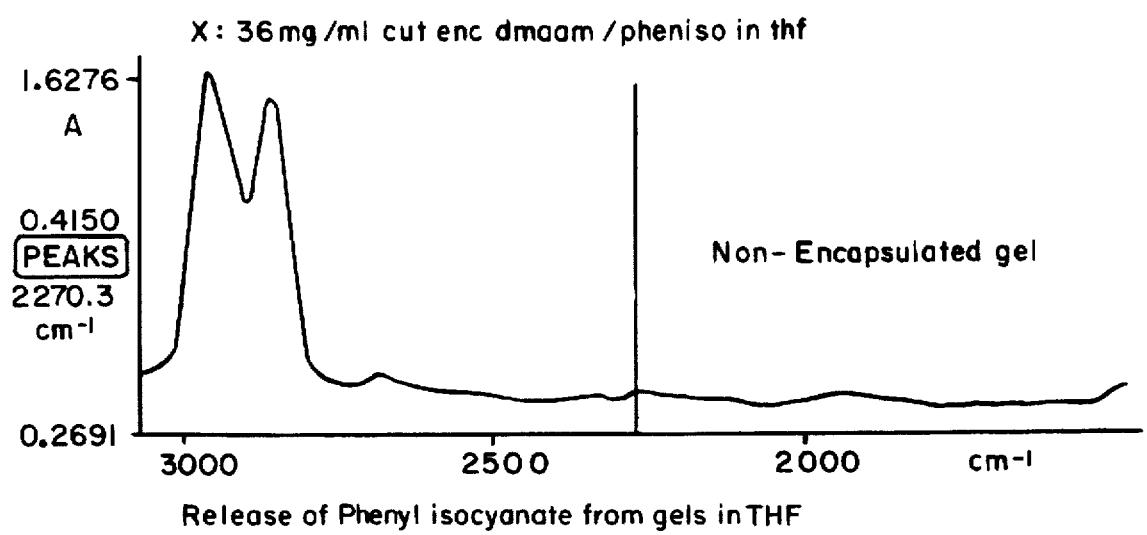

THF solutions surrounding gels were analyzed by FTIR as described in Example 13. The spectra of the THF solutions (FIG. 9) suggest that the solution in contact with the encapsulated gel contained much more phenyl isocyanate than the solution in contact with the non-encapsulated gel.

Example 15

15.1 Gel Synthesis and Swelling

PolyDEAAm, synthesized as described in Example 13 (dry weight 590 mg), was allowed to swell in hexamethylene diisocyanate (Aldrich) for 4 days in a sealed vial at room temperature The isocyanate uptake (i.e., weight of isocyanate per weight of dry polymer) was measured to be 960%.

15.2 Gel Encapsulation

The gel was split into Fractions 1 and 2 and encapsulated as described in Examples 13 and 14. Fraction 1 was left intact and Fraction 2 was sectioned into small pieces as described in Examples 13 and 14.

15.3 Demonstration of Successful Encapsulation in Water

Fractions 1 and 2 were placed in an excess of deionized water for 1 hour as described in Examples 13 and 14. A white polyurea layer formation was formed almost instantaneously around the Fraction 1, leaving the bulk of the encapsulated gel transparent. Small sections of (the non-encapsulated gel) Fraction 2 became completely covered with a white layer and no transparent areas were observed in these gels. This suggests that the encapsulation shell prevents a substantial part of the hexamethylene diisocyanate previously swelled into the gel from reacting with water. The gels were then carefully taken out from water, excess surface liquid wiped up, and dried under vacuum for 1 hour.

15.4 Test of Isocyanate Release from Gel

The dried gels were weighed out and placed into dry THF in such a way that either Fraction 1 (encapsulated gel) or Fraction 2 (non-encapsulated gel) constituted a suspension of 40 mg of gel per 1 ml of THF. We did this to compare the amount of released isocyanate per weight gel. Both Fractions were allowed to stay in THF for 1 hour under constant agitation. Fraction 1 exhibited significant swelling and the white parts produced in 15.3 were apparently dissolved in THF. Fraction 2 demonstrated some swelling but we did not observe any removal of the white polyurea layers.

Figure 10A:
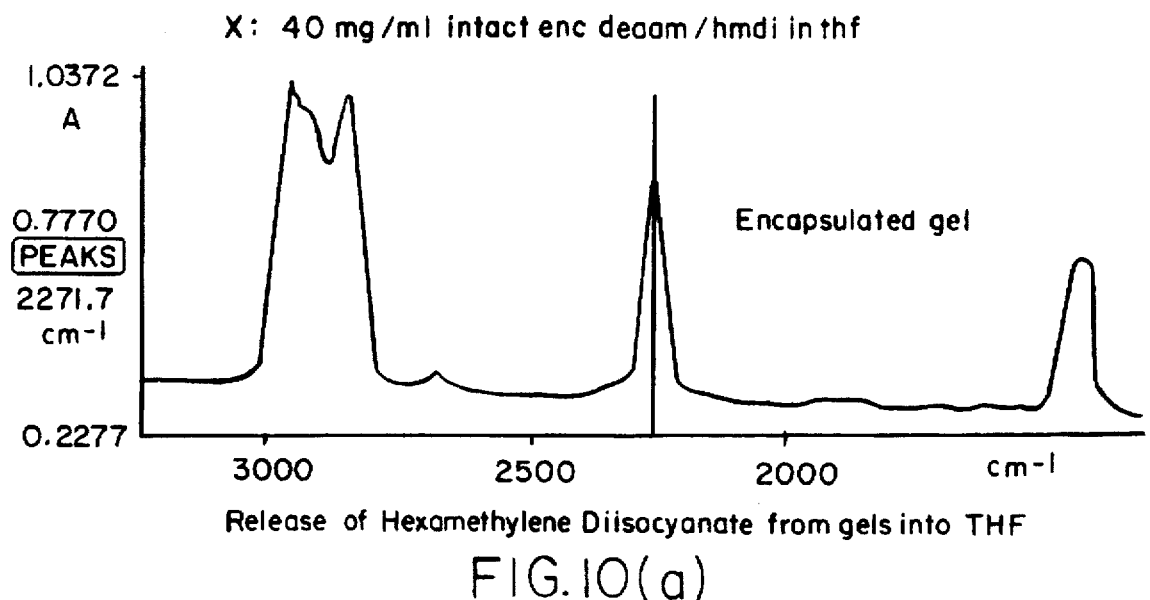
FIGS. 10(a) and 10(b) respectively illustrate FTIR spectra for encapsulated and non-encapsulated hexamethylene diisocyanate molecules in polyurethane-coated poly (diethylacrylamide)gels in a solution of tetrahydrofuran (THF)
Figure 10B:
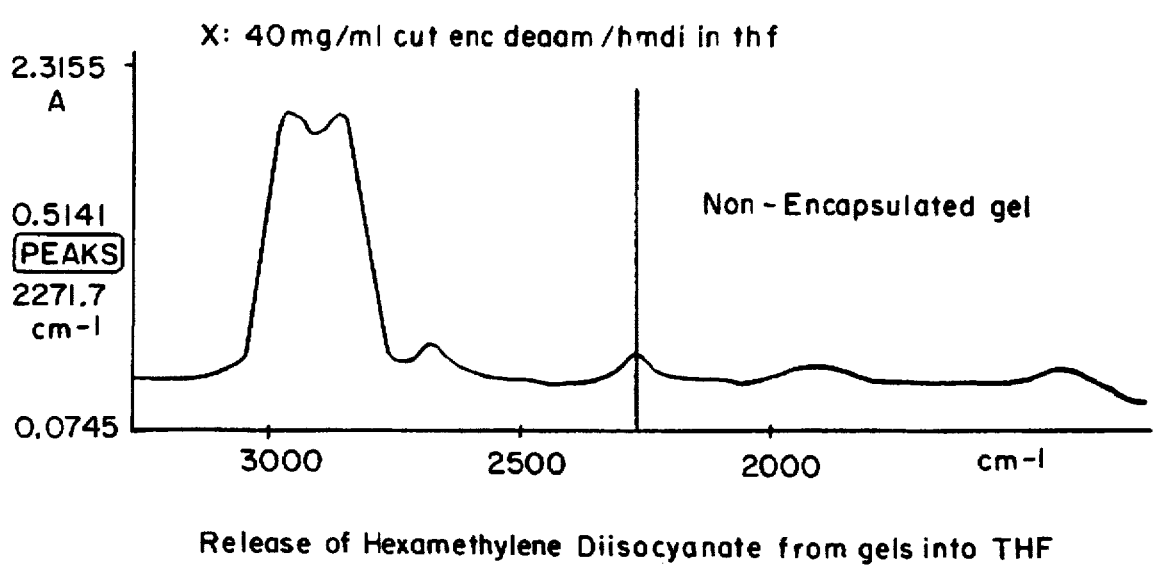

THF solutions surrounding the gels were analyzed by means of FTIR as described in Example 1. The spectra of the THF solutions contacted Fractions 1 and 2 (FIG. 10) reveal that the solution contacting with the encapsulated gel contained much more hexamethylene diisocyanate than the solution contacted with the non-encapsulated gel.

THERMORESPONSIVE LYOGELS

In Examples 16–21, thermoresponsive lyogels were produced. We observed that the lyogels undergo transitions in neat organic solvents from a compact, opaque state at lower temperatures to an expanded, transparent state at higher temperatures. The transition from collapsed, opaque gels to the fully expanded, transparent gels in the solvent is reversible.

Example 16

16.1 Gel Synthesis

A mixture of 6.2 g (49 mmol) N,N-diethylacrylamide (DEAAm, monomer) and 138 µl (0.58 mmol) di(ethylene glycol)bis(allyl carbonate) (DEGBAC, crosslinker) was deaerated by $N_2$ bubbling for 0.5 hour. Then; 20 µl of freshly prepared saturated solution of ammonium persulfate (initiator) in dried dimethylsulfoxide (DMSO) and 10 µl N,N,N',N'-tetramethylethylenediamine (promoter) were added. The solution was stirred and allowed to stand at 3° C. for 2 days. Complete polymerization was not observed, although an increase in viscosity was observed. At room temperature, we observed a hardening of the solution and polymerization was completed at 70° C. in 2 hours, resulting in a strong transparent polymeric network.

16.2 Gel Performance

Sections (10–12 mg) of the gel were placed in excess dry DMSO where they were allowed to swell overnight at 70° C., resulting in greatly expanded (8–12 fold weight gain) transparent gels. The DMSO in which gel had been immersed was cooled down to 40° C. and this resulted in formation of opaque gels of diminished volume. The thermal transition from collapsed (opaque) gels to fully expanded (transparent) gels in DMSO was shown to be reversible.

Example 17

17.1 Gel Synthesis

A mixture of 3.1 g (24 mmol) N,N-diethylacrylamide (DEAAm, monomer) and 55 µl (0.29 mmol) ethylene glycol dimethacrylate (EGDMA, crosslinker) was deaerated by $N_2$ bubbling for 0.5 hour. Then, 20 µl of freshly prepared saturated solution of ammonium persulfate (initiator) in dried dimethylsulfoxide and 10 µl N,N,N',N'-tetramethylethylenediamine (promoter) were added. The solution was stirred and placed into a refrigerator at 3° C. The solution polymerized overnight, resulting in a strong transparent polymeric network.

17.2 Gel Performance

Small pieces (10–12 mg) of the gel were placed in an excess dry DMSO where they were allowed to swell overnight at 70° C., resulting in greatly expanded (8–12-fold weight gain) transparent gels. Cooling the DMSO in which gel had been immersed down to 35°–40° C. and also down to room temperature, resulted in opaque gels of lesser volume. The transition from collapsed (opaque) gels to fully expanded (transparent) gels in DMSO was reversible.

Example 18

18.1 Gel Synthesis and Performance

N,N-Diethylacrylamide (0.89 g, 7 mmol) and ethylene glycol dimethacrylate (EDGMA, 17 µl, 0.084 mmol) were mixed with 9.0 ml dimethylsulfoxide (DMSO) in a 20-ml vial which was then sealed with a sleeve serum stopper. The solution was deaerated by $N_2$-bubbling for approximately 30 minutes followed by addition of 20 mg/ml 2,2'-azobis(2-methylpropionitrile) in DMSO solution (100 µl). The solution was then kept at 70° C. over a two-day period. A transparent gel was formed and this gel collapsed and became opaque at about 40° C. When the gel was exposed to different temperatures from 20°–70° C., the gel underwent reversible phase transitions in volume and transparency.

Example 19

19.1 Gel Synthesis and Performance

N,N-Diethylacrylamide (0.89 g, 7 mmol) and di(ethylene glycol)bis(allyl carbonate) (DEGBAC, 21 µl, 0.084 mmol) were mixed with 9.0 ml dimethylsulfoxide (DMSO) in a 20-ml vial which was then sealed with a sleeve serum stopper. The solution was deaerated by $N_2$-bubbling for 30 minutes followed by addition of 20 mg/ml 2,2'-azobis(2-methylpropionitrile) in DMSO solution (100 µl). The solution was then kept at 70° C. over a two-day period. This resulted in formation of a transparent gel which turned opaque at about 40° C. Temperature-dependent (20°–80° C.) phase transitions in volume and transparency were reversible.

Example 20
20.1 Gel Synthesis

N,N-Diethylacrylamide (0.89 g, 7 mmol) and N,N'-methylenebis(acrylamide) (bis, 13 mg, 0.084 mmol) were mixed with 9.0 ml dimethylsulfoxide DMSO in a 20-ml vial which was then sealed with a sleeve serum stopper. A series of micropipettes (0.1 mm internal diameter) had been inserted into the vial prior addition of the liquid mixture. The solution was deaerated by $N_2$-bubbling followed by addition of 20 mg/ml 2,2'-azobis(2-methylpropionitrile) in DMSO solution (100 µl). The solution was then kept at 70° C. over a two-day period and this resulted in formation of a strong transparent gel which turned opaque at about 40° C.

20.2 Gel Performance

Figure 11:
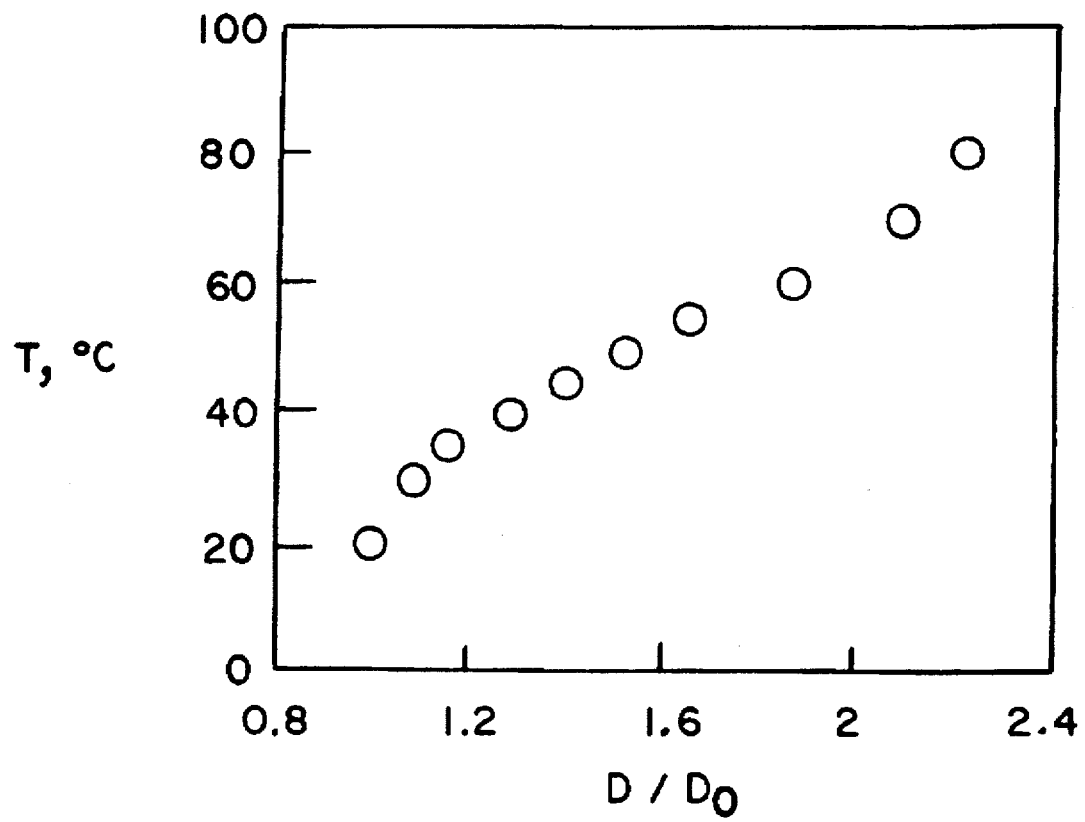
FIG. 11 illustrates the temperature dependency or thermal responsiveness of a N,N-diethylacrylamide/N,N'-methylenebis(acrylamide) (DEAAm/bis) gel in accordance with the present invention.

A piece of the polyDEAAm/bis gel formed in 20.1 was recovered from the micropipette, placed into neat DMSO in a temperature controlled bath and the external diameter of the gel was measured. The gel was maintained at each temperature until an equilibrium diameter had been reached. The temperature-dependent behavior of the gel is illustrated in Table 18 and FIG. 11.

TABLE 18

Temperature-Dependent Behavior of poly(DEAAm) gel in Neat DMSO.

| Temperature, °C. | Diameter, microns |
|---|---|
| 80 | 265 |
| 70 | 250 |
| 60 | 223 |
| 55 | 198 |
| 50 | 182 |
| 45 | 167 |
| 40 | 154 |
| 35 | 138 |
| 30 | 131 |
| 20 | 120 |

Example 21

ENCAPSULATION OF A REACTIVE CHEMICAL INTO LYOGELS FOLLOWED BY TEMPERATURE-TRIGGERED RELEASE

This experiment discloses a process of encapsulating reactive chemicals into thermoresponsive lyogels in which the reactive chemical can be released from lyogels at an elevated temperature in entirely nonaqueous fluids (ie., fluids which lack the presence of any water). The enclosed example illustrates (1) gel synthesis, (2) gel loading with a reactive chemical, (3) release of reactive chemical, and (4) behavior of the released reactive chemical.

21.1 Gel Synthesis

N,N-Diethylacrylamide (0.89 g, 7 mmol) (DEAAm, Polysciences) and N,N'-methylenebis(acrylamide) (bis, 13 mg, 0.084 mmol) (Aldrich) were mixed with 9.0 ml neat dimethylsulfoxide (DMSO) (Aldrich) in a 20-ml vial which was then sealed with a sleeve serum stopper. A series of micropipettes (0.1 mm internal diameter) had been inserted into the vial prior to liquid addition. The solution was deaerated by $N_2$-bubbling followed by addition of 20 mg/ml 2,2'-azobis(2-methylpropionitrile) (Kodak) in DMSO solution (100 µl). The solution was then kept at 70° C. over 48 hours, resulting in a transparent gel which turned opaque at approximately 40° C.

21.2 Gel Loading with Reactive Chemical

A polyDEAAm gel, prepared as described above and equilibrated with neat DMSO at 20° C. for several days in its opaque state, was weighed ($W_{20}$=430 mg) and placed into a 20-ml vial containing excess of 0.5 mg/ml solution of Phenol Red (A.C.S. reagent, Aldrich) in neat DMSO. Phenol Red is widely used as a reactive dye capable of responding to small changes in its electronic environment and was therefore chosen as a representative example of a reactive chemical. The vial was kept at 70° C. for 0.5 h during which time the volume phase transition was observed in the gel. It became transparent and swelled greatly ($W_{70}$=540 mg). Simultaneously, coloration of the gel due to absorption of phenol red was observed. The bright yellow gel was allowed to cool down to 20° C. for 3 hours. Then, the yellow gel in its collapsed, opaque state was placed in a fresh portion of 0.5 mg/ml solution of phenol red in DMSO and kept there for 0.5 h at 70° C. The process of gel loading was repeated 3 times, until the gel was bright yellow in its opaque state.

21.3 Gel Encapsulation

Figure 12A:
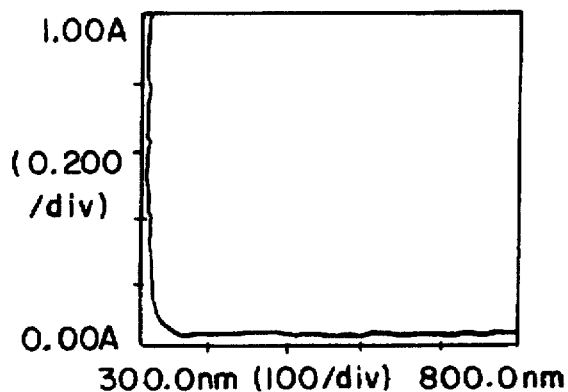
FIGS. 12(a)–12(d) illustrate various electronic spectra for a poly(N,N-diethylacrylamide) gel swollen with phenol red.
Figure 12B:
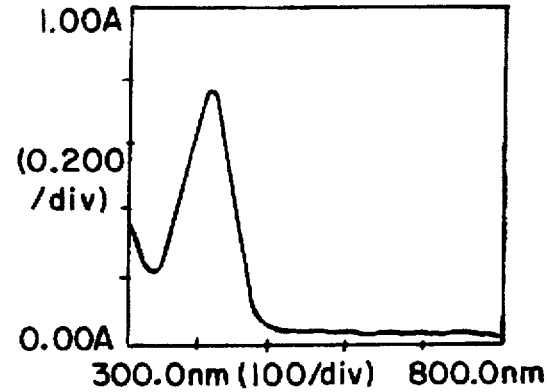

The polyDEAAm gel loaded with phenol red ($W_{20}$=435 mg) as described above and equilibrated with 0.5 mg/ml solution of phenol red in DMSO at 20° C. overnight was placed into trimeric hexamethylene diisocyanate (isocyanate) (Rhone-Poulenc HDTLV) for 10–15 sec and then quickly taken out and placed into poly(propylene glycol)bis(2-aminopropyl ether) {formula $CH_3CH(NH_2)$ $CH_2[OCH_2CH(CH_3)]_nNH_2$} (diamine)(Aldrich) for 10–15 sec where a whitish layer of polyurea formed immediately around the gels. This method of placing the gel sequentially into isocyanate and then into diamine was repeated to thicken the polyurea layer. The weight of the encapsulated gel at 20° C. was measured to be 1.03 g. The encapsulated particle was placed into 5 ml of neat DMSO and kept there for 0.5 h. No coloration of DMSO surrounding encapsulated gel was observed (see FIG. 12(a)). Then the vial with the encapsulated gel in DMSO was kept at 80° C. in a temperature-controlled bath for 1 h, which resulted in swelling of encapsulated gel. ($W_{80}$=1.11 g) Visible breakage of the polyurea encapsulating shell was seen, followed by the appearance of the bright yellow color in DMSO, evidencing the temperature-triggered release of the reactive chemical. Corresponding electronic spectrum in FIG. 12(b) reveals a very distinctive peak $\lambda_{max}$407, $A_{407}$ 0.753) corresponding to bright yellow/orange color.

21.4 Behavior of the Released Reactive Chemical

Figure 12C:
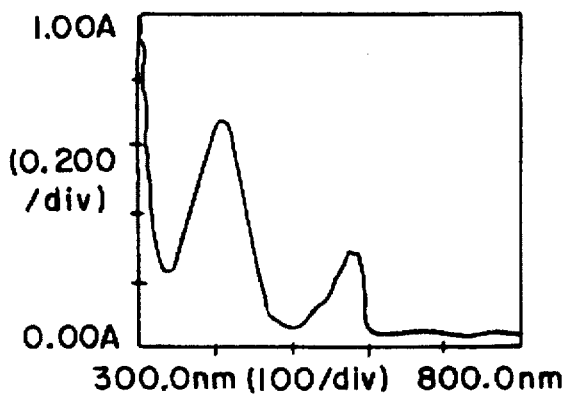
Figure 12D:
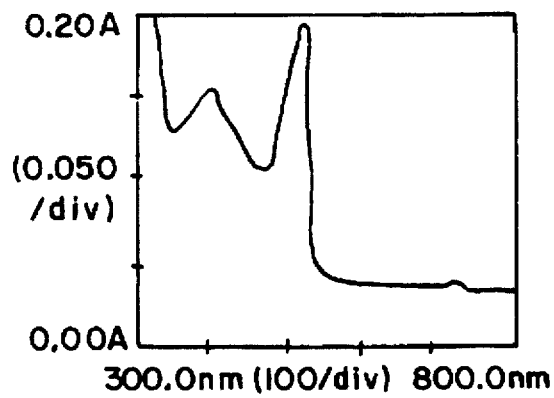

The following experiments were undertaken in order to illustrate the reactivity of the phenol red released from the encapsulated gel upon elevated temperature. The DMSO solution into which phenol red was released was collected and separated into 2 separate portions. Into the first portion, poly(propylene glycol)bis(2-aminopropyl ether) was added resulting in 0.1 mg/ml solution. A color change in the solution from yellow to blue was immediately observed (see FIG. 12(c) with the peaks at 579 and 407 nm). Into the second portion, 2-acrylamido-2-methyl-1-propanesulfonic acid (Aldrich) was added, resulting in 0.5 mg/ml solution. Change of color from yellow to red was almost immediately observed followed by the appearance of the peaks at 512 and 398 nm in the corresponding absorbance spectrum (see FIG. 12(d)).

EQUIVALENTS

It should be appreciated by those skilled in the art that the specific embodiments disclosed above may readily be utilized as a basis for modifying or designing other methods and compositions for carrying out the same purpose of the present invention. For example, it is within the scope of the invention for the first nonaqueous reactive material (i.e. the encapsulated nonaqueous reactive material) to be a polyol, a polyamine or the like. In this type of arrangement, the second nonaqueous reactive material (i.e. non-encapsulated nonaqueous reactive material) may be an isocyanate, a multifunctional amine, an organometallic, an acyl halide, an acrylate, an acid, an acid anhydride, or mixtures thereof. It should also be realized by those skilled in the art that such equivalent constructions do not depart from the spirit and scope of the invention as set forth in the appended claims.

What is claimed is:

1. A composition of matter, comprising: a three-dimensional polymeric gel network wherein the gel network comprises a material selected from the group consisting of poly (N,N-disubstituted acrylamides), polyacrylate esters, polyalkyl substituted vinyl ethers, polyglycol ethers and mixtures thereof, the polymeric gel network having a first reactive material substantially free of water incorporated within the interstices of the gel network, wherein the first reactive material is characterized in that, when the first reactive material is exposed to predetermined conditions, the first reactive material enters into a spontaneous chemical reaction or catalyzes a spontaneous chemical reaction;

a hydrophobic polymeric encapsulation layer on an outer surface of the gel network; and an aqueous medium having the encapsulated gel network immersed therein, wherein the encapsulation layer provides a barrier to efflux of the first reactive material from the gel network and a barrier to influx of the aqueous medium into the gel network under predetermined conditions.

2. The composition of claim 1, wherein the first reactive material comprises a material selected from the group consisting of an isocyanate, a multifunctional amine, an organometallic, an acyl halide, an acid, an acid anhydride, an acrylate, an epoxy and mixtures thereof.

3. The composition of claim 2, wherein the first reactive material further comprises a dye, a pigment, a colorant, an additive or mixtures thereof.

4. The composition of claim 1, wherein the first reactive material contains a catalyst.

5. The composition of claim 4, wherein the catalyst is dibutyltin dilaurate.

6. The composition of claim 1, wherein the polymeric encapsulation layer is selected from the group consisting of a polyurethane, a polyurea and mixtures thereof.

7. The composition of claim 6, wherein the first reactive material contains an isocyanate.

8. The composition of claim 7, wherein the gel network is a gel network of polydiethylacrylamide.

9. The composition of claim 8, wherein the gel network is a gel network of polydimethylacrylamide.

10. The composition of claim 1, wherein the gel network is a responsive gel network.

11. A composition of matter, comprising: a three-dimensional polymeric gel network wherein the gel network comprises a material selected from the group consisting of poly (N,N-disubstituted acrylamides), polyacrylate esters, polyalkyl substituted vinyl ethers, polyglycol ethers and mixtures thereof, the gel network having a first reactive material incorporated within the interstices of the gel network, wherein the first reactive material is characterized in that, when the first reactive material is exposed to predetermined conditions, the first reactive material enters into a spontaneous chemical reaction or catalyzes a spontaneous chemical reaction;

a hydrophobic polymeric encapsulation layer on an outer surface of the gel network; and an aqueous medium having the encapsulated gel network immersed therein, wherein the encapsulation layer provides a barrier to efflux of the first reactive material from the gel network and a barrier to influx of the aqueous medium into the gel network under predetermined conditions.

12. The composition of claim 11, wherein the encapsulation layer comprises a material selected from the group consisting of polyurethanes, polyureas and mixtures thereof.

13. A composition of matter, comprising: a three-dimensional polymeric gel network wherein the gel network comprises a material selected from the group consisting of poly (N,N-disubstituted acrylamides), polyacrylate esters, polyalkyl substituted vinyl ethers, polyglycol ethers and mixtures thereof, the gel network having a first reactive material incorporated within the interstices of the gel network, the first reactive material comprising a material selected from the group consisting of an isocyanate, a multifunctional amine, an organometallic, an acyl halide, an acid, an acid anhydride, an acrylate and an epoxy, wherein the first reactive material is characterized in that, when the first reactive material is exposed to predetermined conditions, the first reactive material enters into a spontaneous chemical reaction or catalyzes a spontaneous chemical reaction;

a hydrophobic polymeric encapsulation layer on an outer surface of the gel network; and an aqueous medium having the encapsulated gel network immersed therein, wherein the encapsulation layer provides a barrier to efflux of the first reactive material from the gel network and a barrier to influx of the aqueous medium into the gel network under predetermined conditions.

14. The composition of claim 13, wherein the gel network is a responsive gel network.

15. The composition of claim 13, wherein the first reactive material contains a catalyst.

16. The composition of claim 15, wherein the catalyst is dibutyltin dilaurate.

17. The composition of claim 13, wherein the first reactive material further comprises a dye, a pigment, a colorant, an additive or mixtures thereof.

18. The composition of claim 13, wherein the polymeric encapsulation layer is selected from the group consisting of a polyurethane, a polyurea and mixtures thereof.

19. The composition of claim 18, wherein the gel network is a gel network of polydiethylacrylamide.

20. The composition of claim 18, wherein the gel network is a gel network of polydimethylacrylamide.

21. A composition of matter, comprising: a three-dimensional polydimethylacrylamide gel network having an isocyanate incorporated within the interstices of the gel network, wherein the isocyanate is characterized in that, when the isocyanate is exposed to predetermined conditions, the isocyanate enters into a spontaneous chemical reaction;

a polyurethane encapsulation layer on an outer surface of the gel network; and an aqueous medium having the encapsulated gel network immersed therein, wherein the encapsulation layer provides a barrier to efflux of the isocyanate from the gel network and a barrier to influx of the aqueous medium into the gel network under predetermined conditions.

* * * * *